(12) United States Patent
Ikonin et al.

(10) Patent No.: US 12,075,035 B2
(45) Date of Patent: Aug. 27, 2024

(54) APPARATUS AND METHOD FOR FILTERING IN VIDEO CODING

(71) Applicant: Huawei Technologies Co., Ltd., Shenzhen (CN)

(72) Inventors: Sergey Yurievich Ikonin, Moscow (RU); Victor Alexeevich Stepin, Moscow (RU); Alexander Alexandrovich Karabutov, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 17/556,180

(22) Filed: Dec. 20, 2021

(65) Prior Publication Data
US 2022/0116597 A1   Apr. 14, 2022

Related U.S. Application Data

(63) Continuation of application No. PCT/RU2020/050127, filed on Jun. 18, 2020.

(30) Foreign Application Priority Data

Jun. 18, 2019  (WO) ................ PCT/RU2019/050090
Jun. 18, 2019  (WO) ................ PCT/RU2019/050091

(51) Int. Cl.
| | |
|---|---|
| *H04N 19/117* | (2014.01) |
| *H04N 19/132* | (2014.01) |
| *H04N 19/136* | (2014.01) |
| *H04N 19/176* | (2014.01) |

(Continued)

(52) U.S. Cl.
CPC ......... *H04N 19/117* (2014.11); *H04N 19/132* (2014.11); *H04N 19/136* (2014.11);
(Continued)

(58) Field of Classification Search
CPC .. H04N 19/117; H04N 19/132; H04N 19/136; H04N 19/176; H04N 19/182;
(Continued)

(56) References Cited

U.S. PATENT DOCUMENTS

2011/0228843 A1    9/2011  Narroschke et al.
2013/0343447 A1*  12/2013  Chen ................... H04N 19/82
                                                    375/240.02
(Continued)

FOREIGN PATENT DOCUMENTS

| CN | 107925773 A | 4/2018 |
|---|---|---|
| CN | 109076237 A | 12/2018 |

(Continued)

OTHER PUBLICATIONS

Lkonin et al., CE14: Hadamard transform domain filter (Test 3), 2018, Joint Video Experts Team (Year: 2018).*

(Continued)

*Primary Examiner* — Hesham K Abouzahra
(74) *Attorney, Agent, or Firm* — Conley Rose, P.C.

(57) ABSTRACT

A filter, to an encoder and a decoder using the filter, to a filtering method and a corresponding program, as well as to encoding and decoding using the filtering method or the filter. The method includes obtaining of an extended reconstructed block by extending the current reconstructed block to include at least padding samples from the current reconstructed block. After padding, a current pixel of the extended reconstructed block and its neighboring pixels are loaded into a linear buffer and transformed with a one-dimensional (1D) transform. The method is performed in frequency domain using a look-up table and the filtered pixels are transformed back.

24 Claims, 17 Drawing Sheets

(51) Int. Cl.
    *H04N 19/182* (2014.01)
    *H04N 19/186* (2014.01)

(52) U.S. Cl.
    CPC ......... *H04N 19/176* (2014.11); *H04N 19/182* (2014.11); *H04N 19/186* (2014.11)

(58) Field of Classification Search
    CPC ...... H04N 19/186; H04N 19/80; H04N 19/82; G06T 5/20
    See application file for complete search history.

(56) References Cited

U.S. PATENT DOCUMENTS

| | | |
|---|---|---|
| 2017/0339419 A1 | 11/2017 | Chuang et al. |
| 2018/0176601 A1 | 6/2018 | Jeong et al. |
| 2018/0332292 A1 | 11/2018 | Lin et al. |
| 2022/0182634 A1* | 6/2022 | Wu .................. H04N 19/60 |

FOREIGN PATENT DOCUMENTS

| | | |
|---|---|---|
| WO | 2010061607 A1 | 6/2010 |
| WO | 2020009617 A1 | 1/2020 |

OTHER PUBLICATIONS

Sergey Ikonin, et al., "CE1: Hadamard transform domain filter (CE1-2)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0478-v3, 23 pages.

JVET-K0068-v3, Victor Stepin et al., "CE2 related: Hadamard Transform Domain Filter," Joint Video Experts Team (JVET) of ITU-T SG 16 WP 3 and 1S0/IEC JTC 1/SC 29/WG11, 11th Meeting: Ljubljana, SI, Jul. 10-18, 2018, 5 pages.

JVET-L326-v3, Sergey Ikonin, et al., "CE14: Hadamard transform domain filter (Test 3)," Joint Video Experts Team (JVET) of ITU-T SG 16 WP 3 and 1S0/IEC Jtc 1/SC 29/WG11, 12th Meeting: Macao, CN, Oct. 3-12, 2018, 15 pages.

JVET-N0479-v3, Sergey Ikonin, et al., "CEI-related: Hadamard transform domain in-loop filter also using bottom/right reconstructed samples," Joint Video Experts Team (JVET) of ITU-T SG 16 WP 3 and ISO/IECJTC 1/SC 29/WG11, 14th Meeting: Geneva, CH, Mar. 19-27, 2019, 4 pages.

* cited by examiner

APPARATUS AND METHOD FOR FILTERING IN VIDEO CODING

CROSS-REFERENCE TO RELATED APPLICATIONS

This is a continuation of International Patent Application No. PCT/RU2020/050127 filed on Jun. 18, 2020, which claims priority to International Patent Application No. PCT/RU2019/050091 filed on Jun. 18, 2019 and International Patent Application No. PCT/RU2019/050090 filed on Jun. 18, 2019. The disclosures of the aforementioned applications are hereby incorporated by reference in their entireties.

TECHNICAL FIELD

Generally, the present disclosure relates to the field of video coding. In particular, the present disclosure relates to a filter for video coding and to a method for filtering reconstructed video frames, a program implementing such method, as well as an encoding apparatus and a decoding apparatus comprising said filter for video coding.

BACKGROUND

Digital video has been widely used since the introduction of DIGITAL VIDEO DISC (DVD)-discs. Before transmission, the video is encoded and transmitted using a transmission medium. The viewer receives the video and uses a viewing device to decode and display the video. Over the years the quality of video has improved, for example, because of higher resolutions, color depths and frame rates. This has led to larger data streams that are nowadays commonly transported over internet and/or over mobile communication networks.

Higher resolution videos, however, typically require more bandwidth, as they carry more information. In order to reduce bandwidth requirements, video coding standards involving compression of the video have been introduced. When the video is encoded, the bandwidth requirements (or the corresponding memory requirements in case of storage) are reduced. Often, this reduction comes at the cost of quality. Thus, the video coding standards try to find a balance between bandwidth requirements and quality.

As there is a continuous need for improving quality and reducing bandwidth requirements, solutions that maintain the quality with reduced bandwidth requirements or improve the quality while maintaining the bandwidth requirements are continuously searched. Furthermore, sometimes compromises may be acceptable. For example, it may be acceptable to increase the bandwidth requirements if the quality improvement is significant.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the International Telecommunication Union (ITU) Telecommunication Standardization Sector (ITU-T) Video Coding Experts Group (VCEG) and the ISO/IEC Moving Picture Experts Group (MPEG) standardization organizations, working together in a partnership known as the Joint Video Exploration Team (WET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Image filtering is frequently used to emphasize certain features of an image or to enhance the objective or perceptual quality of the filtered image. Image filtering has to deal with various sources of noise. Accordingly, various approaches for quality enhancement have been proposed and are currently in use. For example, in an adaptive loop filter (ALF) method, each reconstructed frame is divided into a set of small macro-blocks (super-pixels) and each macro-block is filtered by the adaptive loop filter in that each pixel of the filtered reconstructed frame is a weighted sum of several pixels in the connected area of the pixel from the reconstructed frame around the position of the generating filtered pixel. Weighting coefficients (or filter coefficients) have property of central symmetry and are transmitted from the encoder to the decoder side. Edges often have a big size and therefore the number of transmitted weighting coefficients can become too large for an efficient processing. A large number of weighting coefficients requires a complex rate-distortion optimization (RDO) at the encoder side for decreasing the number of weighting coefficients for transmission. On the decoder side, ALF requires implementation of universal multipliers and these multipliers should be reloaded for each 2×2 pixel block.

Thus, there is a need for an improved filter and a method allowing to improve the prediction quality with low complexity and, thus, increase the video coding efficiency.

SUMMARY

It is an object of the disclosure to provide an improved filter and method allowing to improve the filtering efficiency with limited complexity and, thus, increase the video coding efficiency.

The foregoing and other objects are achieved by the subject matter of the independent claims. Further implementation forms are apparent from the dependent claims, the description and the figures.

According to some embodiments, current reconstructed block is extended to include padding samples which are obtained from the current reconstructed block before the extended reconstructed block is filtered in the frequency domain.

Such extension facilitates efficient and unified filtering even for pixels which do not have available neighboring samples.

According to an aspect, a filter is provided for use in a video encoding apparatus or a video decoding apparatus to process a current reconstructed block, the current reconstructed block comprising a plurality of pixels, wherein the filter is configured to obtain an extended reconstructed block by extending the current reconstructed block to include one or more padding samples obtained based on at least one sample from the current reconstructed block, load a current pixel of the extended reconstructed block and its neighboring pixels of the current pixel to a linear buffer according to a predefined scan template, obtain spectrum components by performing a one-dimensional (1D) transform for pixels in the linear buffer, obtain filtered spectrum components based on the obtained spectrum components by using a lookup table, obtain filtered pixels by performing an inverse 1D transform for the filtered spectrum components, and generate a filtered reconstructed block based on the filtered pixels.

The filter in frequency domain facilitates a low-complexity implementation, while the extension of the current reconstructed block may improve the quality of the filtering and may allow for application of the same filtering operation (e.g. same size/shape of the filter) for all pixels of the block. However, it is noted that the present disclosure is not limited to actually applying such uniform filter operation.

The current reconstructed block is obtained by a reconstruction of a current block. The current reconstructed block refers to reconstructed samples of a current block. The reconstruction may be part of the video encoding and/or video decoding respectively performed by the video encoder and/or decoder, and in particular by a reconstruction unit of the video encoder and/or by a reconstruction unit of the video decoder.

In an embodiment, the current reconstructed block is extended to further include one or more padding samples obtained based on at least one sample from a neighboring reconstructed block adjacent to the current reconstructed block.

Providing of both padding types, based on neighboring samples and based on current reconstructed block samples facilitate more smooth filtering results on the block boundaries.

For example, the current reconstructed block is extended to include the one or more padding samples obtained based on the at least one sample from the neighboring reconstructed block when the neighboring reconstructed block is available and/or the current reconstructed block is extended to include a sample from the current reconstructed block when the neighboring reconstructed block is not available.

Thus, neighboring pixels may be used whenever possible as they may contain more information. For non-available neighboring samples, the padding based on the current reconstructed block may still enable a unified filter (same for pixels of the current reconstructed block) and improve filtering results.

In this example, padding samples can be taken from the current reconstructed block and used as padding samples. However, the present disclosure is not limited thereto and the padding samples can be derived from the samples of current reconstructed blocks. For example, the padding samples may be derived based on one or more of the samples of current reconstructed block(s). The derivation may be by filtering, by selecting specific samples or a combination of samples, or the like.

According to an exemplary implementation, the filter is further configured to determine whether the neighboring reconstructed block is available for the current reconstructed block based on one or more of the following: blocks coding order, the current reconstructed block and the neighboring reconstructed block belong to the same picture group, wherein the same picture group includes the same slice, the same tile or the same tile group, or a location of the neighboring reconstructed block beyond a picture boundary.

Such determination of availability takes into account limitations of the picture boundaries and may facilitate provision of parallel processing by supporting independent picture parts such as tiles, slices, and the like.

For example, the filter is configured to derive the availability for the neighboring reconstructed block as follows. If one or more of the following conditions are true, the availability for the neighboring reconstructed block is determined as false: (i) the neighboring reconstructed block is contained in a different tile than the current block, (ii) a location of the neighboring reconstructed block is beyond a picture boundary, (iii) a variable indicating whether the neighboring reconstructed block has been reconstructed is equal to false, otherwise, the availability for the neighboring reconstructed block is determined as true. For example, the variable indicating whether the neighboring reconstructed block has been reconstructed may take a value true or false. The value of the variable may be determined based on block coding order (block reconstruction order). In particular, the block coding order specifies in which order the blocks are coded and thus also which blocks have been coded before the current block.

According to an exemplary implementation, the one or more padding samples are filtered samples from the neighboring reconstructed block, which is a previously reconstructed block adjacent to the current reconstructed block.

Pre-filtering of padding samples may further improve filtering quality.

For example, the current reconstructed block is extended on left and top sides to include one or more padding samples obtained based on samples from neighboring reconstructed blocks on the left and top sides. The neighboring reconstructed blocks are, e.g. previously reconstructed blocks adjacent to the current reconstructed block on the left and top sides.

In addition or alternatively, the current reconstructed block is extended on right and bottom sides to include the one or more padding samples based on at least one sample from the current reconstructed block.

Such extension may be readily used in system with block scan order from left to right and from top to bottom, as in these systems, typically let and top neighboring blocks are available, while the bottom and right blocks may be unavailable.

In an embodiment, the obtaining of the extended reconstructed block includes extending the current reconstructed block to include on each side (e.g. top, bottom, right, left) of the current reconstructed block neighboring reconstructed samples from a neighboring reconstructed block adjacent to the current reconstructed block on said side, if said neighboring reconstructed block is available, or the closest samples from the current reconstructed block otherwise.

In other words, the filter is configured to obtain the extended reconstructed block by extending the current reconstructed block to include on each side of the current reconstructed block neighboring reconstructed samples from a neighboring reconstructed block adjacent to the current reconstructed block on said side, if said neighboring reconstructed block is available or the closest samples from the current reconstructed block, otherwise.

Such approach facilitates extending the current reconstructed block on all its borders by appropriate padding samples which may result in improved filtering quality. In particular, it may be possible to obtain a more smooth transition between neighboring blocks by involving samples from neighboring adjacent blocks into the filtering process. Another benefit is unification filtering process for border and inner samples of the current block allowing to avoid condition checks and conditional processing during the filtering.

For example, the obtaining of the extended reconstructed block, RecSamplesPad[x][y], with samples x=−1 . . . nCbW, y=−1 . . . nCbH includes, for the current reconstructed block, recSamples[x][y], with (xCb, yCb) specifying the top-left sample of the reconstructed block, and nCbW, nCbH specifying the width and the height of the current reconstructed block: when $0 \le x \le nCbW-1$ and $0 \le y \le nCbH-1$, then recSamplesPad[x][y]=recSamples[x][y], and, otherwise, for (xCb+x, yCb+y): a variable dx is set to 0 and a variable dy is set to 0, when x=−1 and sample (xCb+x, yCb+y) is not available, dx=1, when x==nCbW and sample (xCb+x, yCb+y) is not available, dx=−1, when y==−1 and sample (xCb+x, yCb+y) is not available, dy=1, when y==nCbH and sample (xCb+x, yCb+y) is not available, dy=−1, RecSamplesPad [x][y]=recSamples[x+dx][y+dy].

It is noted that recSamplesPad corresponds to the extended reconstructed block samples, whereas the recSamples correspond to the current reconstruction block samples.

In some embodiments, the filter is further configured to determine whether the neighboring reconstructed block is available for the current reconstructed block, wherein, for the current reconstructed block being an inter-predicted block, if the neighboring reconstructed block is not an inter-predicted block, availability of the neighboring reconstructed block is determined to be false.

Considering prediction mode such as inter-prediction mode facilitates provision of parallel processing such as provision of separate processing pipes for inter and intra coded samples, or the like.

In an exemplary implementation, the lookup table is obtained based on a quantization parameter (QP) of the current reconstructed block. This facilitates efficient implementation without necessity for complex calculations.

In an embodiment, the one or more padding samples obtained based on at least one sample from a neighboring block are reference samples used for intra prediction of a current image block of the current reconstructed block, wherein a reconstructed block of the current image block is the current reconstructed block. The one or more padding samples are reference samples used for intra prediction of a current image block, wherein the current reconstructed block of the current image block is generated or obtained based on a prediction block generated or obtained from the intra prediction (and residual block).

Reusing intra prediction reference samples may facilitate higher implementation efficiency, better memory utilization and lower delay.

For example, the filter is further configured to obtain the one or more padding samples based on the result of intra reference samples derivation. In particular, the intra reference samples derivation comprises derivation of availability of neighboring reconstructed samples and retrieving the neighboring reconstructed samples if the neighboring reconstructed samples are available, substituting the neighboring reconstructed samples by other available neighboring reconstructed samples if the neighboring reconstructed samples are not available.

Such particular intra reference sample availability determination may also be reused for the determination of availability for the padding samples.

In the following the corresponding method embodiments are exemplified. They may achieve similar advantages as their counterpart filter embodiments mentioned above.

According to an aspect, a method is provided for processing a current reconstructed block, wherein the current reconstructed block comprises a plurality of pixels, wherein the filtering method comprises obtaining an extended reconstructed block by extending the current reconstructed block to include one or more padding samples obtained based on at least one sample from the current reconstructed block, loading a current pixel of the extended reconstructed block and its neighboring pixels of the current pixel to a linear buffer according to a predefined scan template, obtaining spectrum components by performing 1D transform for pixels in the linear buffer, obtaining filtered spectrum components by multiplying each spectrum component with a gain coefficient or by using a lookup table, wherein the gain coefficient depends on a corresponding spectrum component and a filtering parameter, obtaining filtered pixels by performing inverse 1D transform for filtered spectrum components, and generating a filtered reconstructed block based on the filtered pixels.

For example, the current reconstructed block is extended to further include one or more padding samples obtained based on at least one sample from a neighboring reconstructed block adjacent to the current reconstructed block.

According to an embodiment, the current reconstructed block is extended to include the one or more padding samples obtained based on the at least one sample from the neighboring reconstructed block when the neighboring reconstructed block is available, and/or the current reconstructed block is extended to include a sample from the current reconstructed block when the neighboring reconstructed block is not available.

In addition or alternatively, the method further comprises a step of determining whether the neighboring reconstructed block is available for the current reconstructed block based on one or more of the following: blocks coding order, the current reconstructed block and the neighboring reconstructed block belong to the same picture group, wherein the same picture group includes the same slice, the same tile or the same tile group, or a location of the neighboring reconstructed block beyond a picture boundary.

According to an exemplary implementation, the method further comprises deriving the availability for the neighboring reconstructed block as follows. If one or more of the following conditions are true, the availability for the neighboring reconstructed block is determined as false the neighboring reconstructed block is contained in a different tile than the current block, a location of the neighboring reconstructed block is beyond a picture boundary, a variable indicating whether the neighboring reconstructed block has been reconstructed is equal to false, otherwise, the availability for the neighboring reconstructed block is determined as true.

For example, the one or more padding samples are filtered samples from the neighboring reconstructed block, which is a previously reconstructed block adjacent to the current reconstructed block.

The current reconstructed block may be extended on left and top sides to include samples obtained based on samples from previously reconstructed adjacent blocks on the left and top sides.

Alternatively or in addition, the current reconstructed block may be extended on right and bottom sides to include the one or more padding samples based on at least one sample from the current reconstructed block.

According to an embodiment, the obtaining of the extended reconstructed block includes extending the current reconstructed block to include on each side of the current reconstructed block neighboring reconstructed samples from a neighboring reconstructed block adjacent to the current reconstructed block on said side if said neighboring reconstructed block is available or the closest samples from the current reconstructed block otherwise.

In particular, the obtaining of the extended reconstructed block, recSamplesPad[x][y], with samples x=−1 . . . nCbW, y=−1 . . . nCbH includes, for the current reconstructed block, recSamples[x][y], with (xCb, yCb) specifying the top-left sample of the reconstructed block, and nCbW, nCbH specifying the width and the height of the current reconstructed block: when $0 \leq x \leq nCbW-1$ and $0 \leq y \leq nCbH-1$, then recSamplesPad[x][y]=recSamples[x][y], and otherwise, for (xCb+x, yCb+y): a variable dx is set to 0 and a variable dy is set to 0, when x==−1 and sample (xCb+x, yCb+y) is not available, dx=1, when x==nCbW and sample (xCb+x, yCb+y) is not available, dx=−1, when y==−1 and sample (xCb+x, yCb+y) is not available, dy=1, when y==nCbH and sample (xCb+x, yCb+y) is not available, dy=−1, recSamplesPad[x][y]=recSamples[x+dx][y+dy].

In some embodiments, the method further comprises determining whether the neighboring reconstructed block is available for the current reconstructed block, wherein for the current reconstructed block being an inter-predicted block, if the neighboring reconstructed block is not an inter-predicted block, availability of the neighboring reconstructed block is determined to be false.

In an exemplary implementation, the lookup table is obtained based on current reconstructed block QP.

In an embodiment, the one or more padding samples obtained based on at least one sample from a neighboring block are samples intended for intra prediction of a current image block of the current reconstructed block.

In particular, the obtaining of the one or more padding samples is based on the result of intra reference samples derivation.

In an exemplary implementation, the intra reference samples derivation comprises derivation of availability of neighboring reconstructed samples and retrieving the neighboring reconstructed samples if the neighboring reconstructed samples are available, substitution of the neighboring reconstructed samples by other available neighboring reconstructed samples if the neighboring reconstructed samples are not available.

According to an aspect, an encoding method is provided for encoding a current block from an input video stream, wherein the encoding method comprises filtering a current reconstructed block of the current block according to any of the above mentioned aspects, embodiments and examples.

According to an aspect, a decoding method is provided for decoding a current reconstructed block from a received bitstream, wherein the decoding method comprises the method for filtering according to any of the above mentioned aspects, embodiments and examples.

According to an aspect the disclosure relates to an encoding apparatus for encoding a current frame from an input video stream, wherein the encoding apparatus comprises a filter according to any of the above-mentioned aspects, embodiments and examples.

According to an aspect the disclosure relates to a decoding apparatus for decoding a current reconstructed frame from a received bitstream, wherein the decoding apparatus comprises a filter according to any of the above-mentioned aspects, embodiments and examples.

According to an aspect the disclosure relates to a computer program product comprising program code for performing the method according any of the above-mentioned aspects, embodiments and examples when executed on a computer.

According to an aspect, a decoder is provided, comprising one or more processors, and a non-transitory computer-readable storage medium coupled to the processors and storing programming for execution by the processors, wherein the programming, when executed by the processors, configures the decoder to carry out the method according to any one of the preceding claims.

According to another aspect, an encoder is provided, comprising one or more processors, and a non-transitory computer-readable storage medium coupled to the processors and storing programming for execution by the processors, wherein the programming, when executed by the processors, configures the encoder to carry out the method according to any one of the preceding claims.

According to an aspect, a non-transitory computer-readable medium is provided carrying a program code which, when executed by a computer device, causes the computer device to perform the method of any one of the preceding claims.

Thus, the filter is provided allowing improving the efficiency for video coding. Furthermore, the improved filter according to embodiments of the disclosure estimates filter parameters from the reconstructed frame itself without filter parameters signaling and, therefore, requires significantly less signaling than conventional filters, which signal weight coefficients for filtering in the image domain.

BRIEF DESCRIPTION OF THE DRAWINGS

Further embodiments of the disclosure will be described with respect to the following figures.

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless further noted otherwise.

Figure 1:
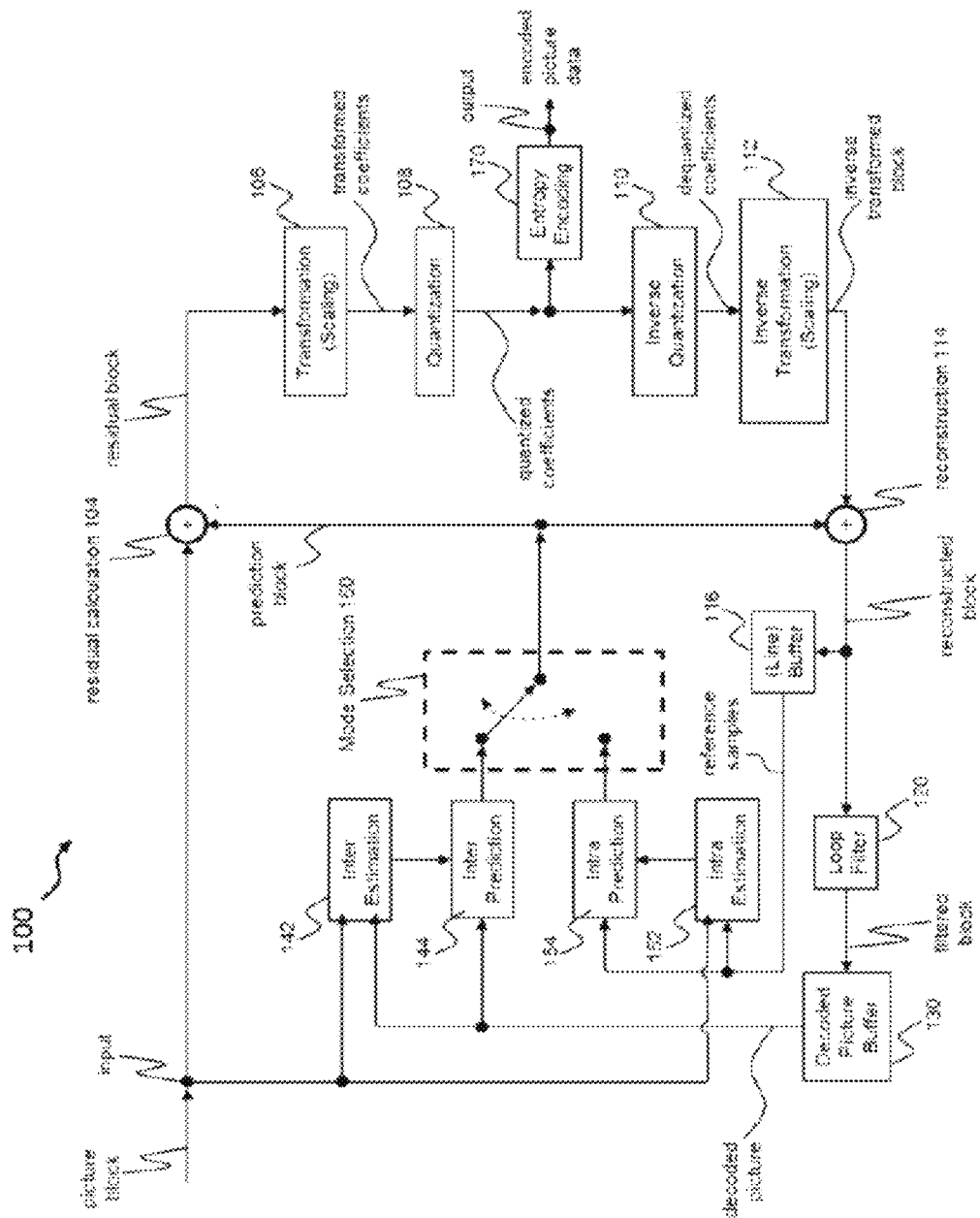
FIG. 1 shows a schematic diagram illustrating an encoding apparatus according to an embodiment comprising a filter according to an embodiment.

FIG. 1 shows an encoding apparatus 100 according to an embodiment comprising a filter 120 according to an embodiment. The encoding apparatus 100 is configured to encode a block of a frame of a video signal comprising a plurality of frames (pictures or images), wherein each frame is dividable into a plurality of blocks and each block comprises a plurality of pixels. In an embodiment, the blocks could be macro blocks, coding tree units, coding units, prediction units and/or prediction blocks.

The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ. The term "block" in this disclosure may refer to an M×N (M-column by N-row) array of samples, or an M×N array of transform coefficients.

A frame of video may be regarded as a (digital) picture which can be regarded as a two-dimensional array or matrix of samples with intensity values. A sample in the array may also be referred to as pixel (i.e., picture element) or a pel. The number of samples in horizontal and vertical direction (or axis) of the array or picture define the size and/or resolution of the picture. For representation of color, typically three color components are employed, i.e. the picture may be represented or include three sample arrays. In red, green, and blue (RBG) format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. It is understood that the present disclosure is applicable to samples (pixels) of any one or more (or all) color components.

It is noted that the term video coding generally applies for video encoding and/or video decoding.

In the exemplary embodiment shown in FIG. 1, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 1 comprises an intra prediction unit 154 for intra prediction. An intra frame can be decoded without information from other frames. The intra prediction unit 154 can perform the intra prediction of a block on the basis of information provided by the intra estimation unit 152. It is noted that in another example, the intra estimation unit 152 and intra prediction unit 154 may be not separately presented in the encoding apparatus 100, for example, the intra estimation unit 152 and intra prediction unit 154 may be integrated together.

In an example, the intra prediction unit 154 may be responsible for reference samples derivation that comprises logic for checking availability of neighboring reconstructed samples and retrieving the neighboring reconstructed samples (e.g. form the line buffer 116 in some specific implementations) if they are available, and substituting them by other available (neighboring) samples if they are not available. These reference samples are used as an input for intra prediction.

The blocks of subsequent frames following the first intra frame can be coded using inter or intra prediction, as selected by a mode selection unit 160. To this end, the encoding apparatus 100 shown in FIG. 1 further comprises an inter prediction unit 144. Generally, the inter prediction unit 144 can be configured to perform motion compensation of a block based on motion estimation provided by the inter estimation unit 142. It is noted that in another example, the inter estimation unit 142 and inter prediction unit 144 may be not separately presented in the encoding apparatus 100, for example, the inter estimation unit 142 and inter prediction unit 144 may be integrated together.

Furthermore, in the hybrid encoder embodiment shown in FIG. 1, a residual calculation unit 104 determines the difference between the original block and its prediction, i.e. the residual block defining the prediction error of the intra/inter picture prediction. This residual block is transformed by the transformation unit 106 (for instance using a discrete cosine transform (DCT)) and the transformation coefficients are quantized by the quantization unit 108. The output of the quantization unit 108 as well as the coding or side information provided, for instance, by the intra prediction unit 154, the inter prediction unit 144 and the filter 120 are further encoded by an entropy encoding unit 170.

A hybrid video encoder usually duplicates the decoder processing such that both will generate the same predictions. Thus, in the embodiment shown in FIG. 1 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by the filter 120, which will be described in more detail below. The final picture is stored in the decoded picture buffer 130 and can be used for the inter prediction of subsequent frames.

Figure 2:
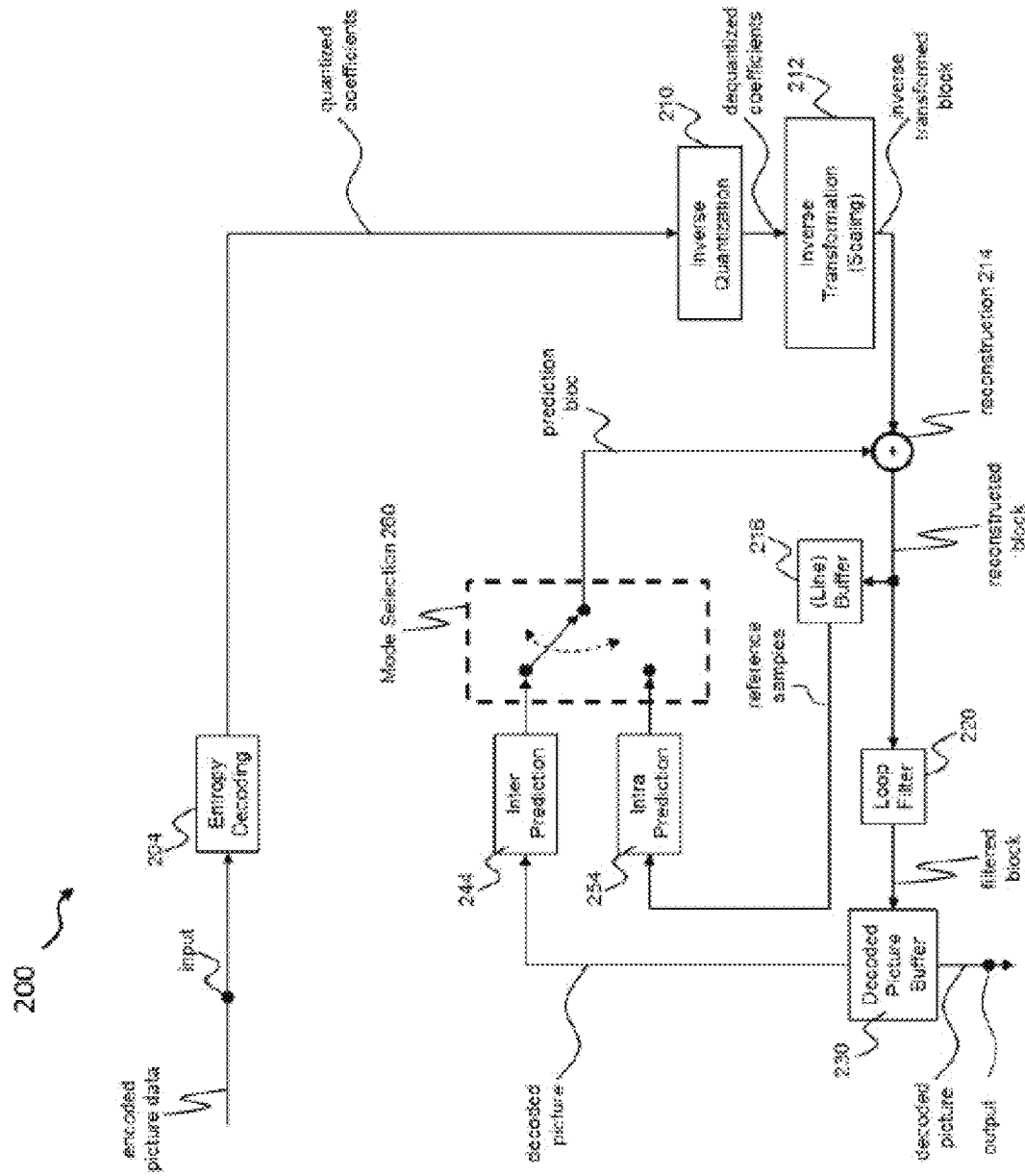
FIG. 2 shows a schematic diagram illustrating a decoding apparatus according to an embodiment comprising a filter according to an embodiment.

FIG. 2 shows a decoding apparatus 200 according to an embodiment comprising a filter 220 according to an embodiment. The decoding apparatus 200 is configured to decode a block of a frame of an encoded video signal. In the embodiment shown in FIG. 2 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for an intra prediction unit 254 and an inter prediction unit 244 as well as other components of the decoding apparatus 200, such as the filter 220. Generally, the intra prediction unit 254 and the inter prediction unit 244 of the decoding apparatus 200 shown in FIG. 2 are selected by a mode selection unit 260 and function in the same way as the intra prediction unit 154 and the inter prediction unit 144 of the encoding apparatus 100 shown in FIG. 1, so that identical predictions can be generated by the encoding apparatus 100 and the decoding apparatus 200. The intra prediction unit 154, 254 may be responsible for reference samples derivation that comprises logic for checking availability of neighboring reconstructed samples and retrieving neighboring reconstructed samples (e.g. form the line buffer 216, 116 in some specific implementation) if they are available and substitution them by other available neighboring samples if they are not available. These reference samples are used as an input for intra prediction. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the filter 220 for inter prediction.

As already described above, the filter 120, 220 may be used at a frame level, for example, the filter 120, 220 may be configured to process a reconstructed frame from a decoded reconstructed video stream for generating a filtered reconstructed frame, where the reconstructed frame includes a plurality of blocks. The filter 120, 220 may be also used at a block level after block reconstruction (or post-reconstruction filter) without waiting for a whole frame, for example, the filter 120, 220 may be configured to process a reconstructed block for generating a filtered reconstructed block and also providing filtered reconstructed samples to the line buffer 1016, 1116, as it exemplary illustrated on FIG. 10 or filtered reconstructed samples to the line buffer 1116, as it exemplary illustrated on FIG. 11, where the reconstructed block includes a plurality of pixels.

Figure 10:
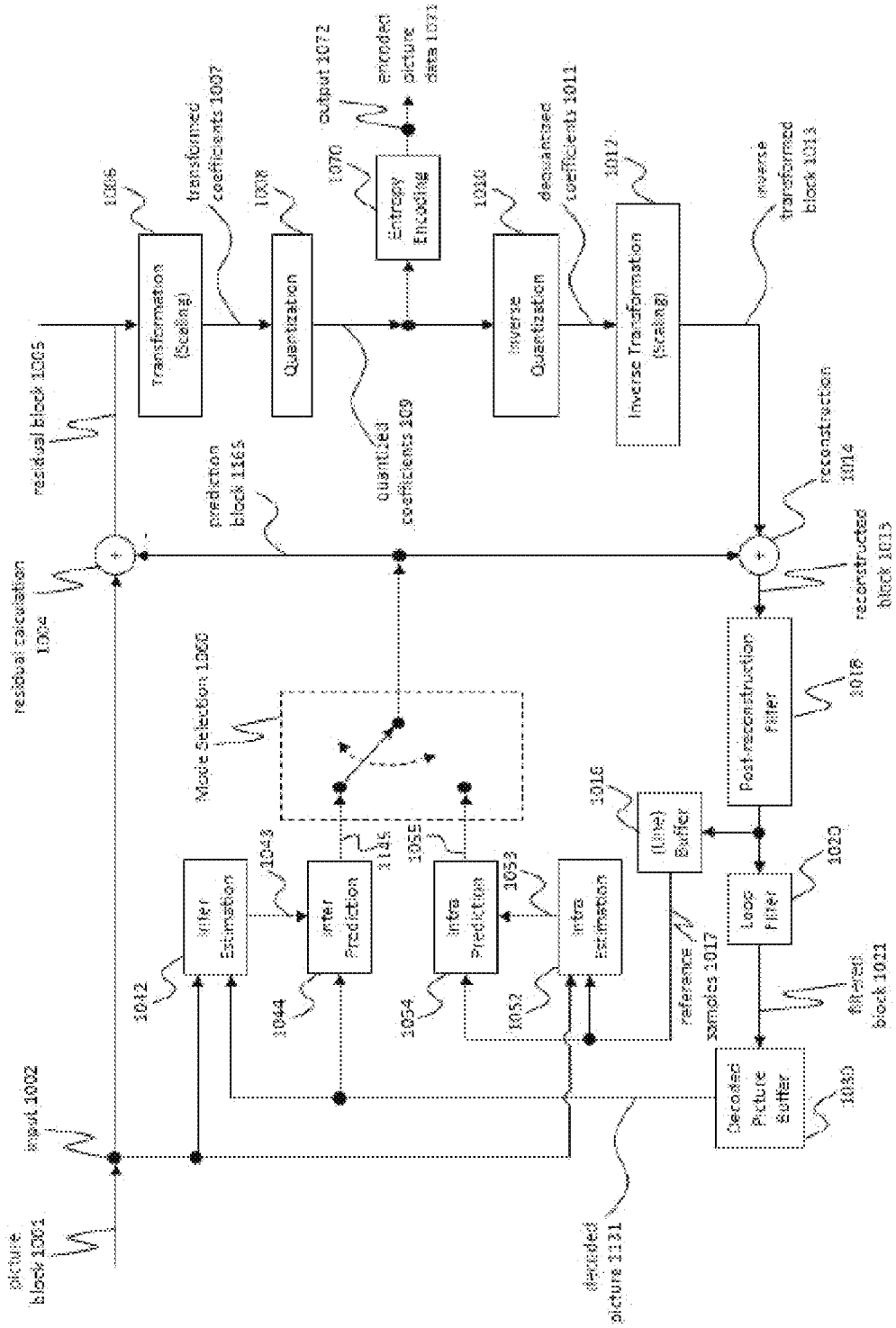
FIG. 10 shows a schematic diagram illustrating an encoding apparatus according to another embodiment comprising a filter according to another embodiment.

FIG. 10 shows an example of an encoding apparatus 1000 according to another embodiment, where the filter is applied as a post-reconstruction filter 1018 after block reconstruction, such as immediately after block reconstruction. Result of a reconstruction unit 1014 can be provided to the post-reconstruction filter 1018. Then, the result of the post-reconstruction filter 1018 can be provided to a line buffer 1016 and is further processed by a loop filter 1020 or directly provided to a decoded picture buffer 1030.

Figure 11:
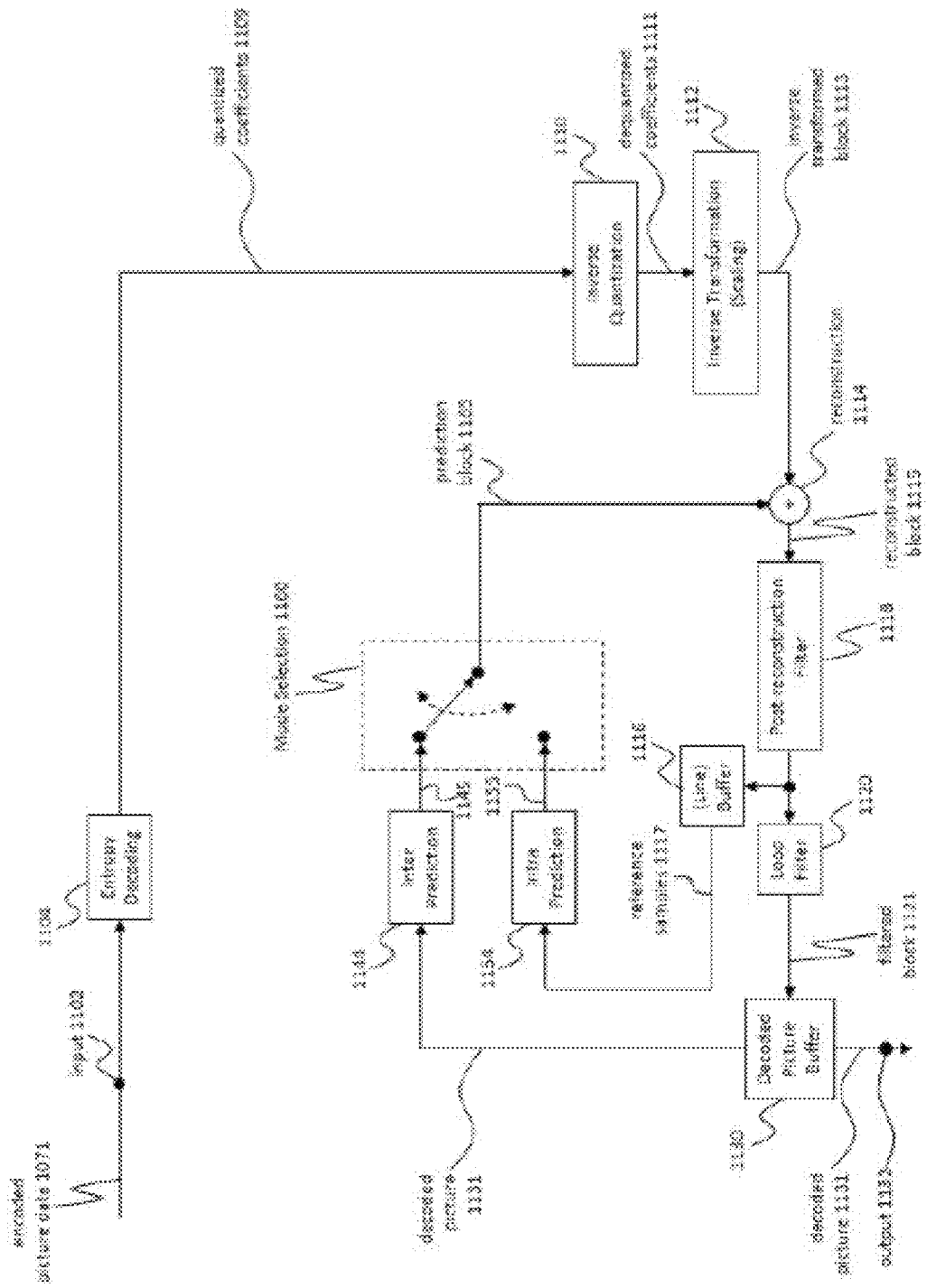
FIG. 11 shows a schematic diagram illustrating a decoding apparatus according to another embodiment comprising a filter according to another embodiment.

FIG. 11 shows an example of a decoding apparatus 1100 according to another embodiment, where the filter is applied as a post-reconstruction filter 1118 after block reconstruction, such as immediately after block reconstruction. Result of a reconstruction unit 1114 can be provided to the post-reconstruction filter 1118. Then, the result of the post-reconstruction filter 1118 can be provided to a line buffer 1116 and is further processed by a loop filter 1120 or directly provided to a decoded picture buffer 1130.

The filter 120, 220, 1018, 1118 comprises, in an embodiment, one or more processors (or one or more processing units or processing circuitry). As will be explained in more detail below, the one or more processors (or one or more processing units or processing circuitry) is/are configured to load a current pixel and its neighboring pixels to a linear buffer according to a predefined scan template (in other words, scan order, or scan pattern), obtain spectrum components by performing 1D transform for each pixel in the linear buffer, obtain filtered spectrum by multiplying each spectrum component with a gain coefficient, wherein the gain coefficient depends on a corresponding spectrum component and a filtering parameter, obtain filtered pixels by performing inverse 1D transform for filtered spectrum, and generate a filtered reconstructed block based on the filtered pixels estimated on previous processing steps. In an example, the gain coefficient depends on a corresponding spectrum component and a filtering parameter. In another example, the gain coefficient depends on one or more filtering parameters and one or more corresponding spectrum components. In other example, the respective gain coefficient may depend on one or more filtering parameters and the corresponding spectrum component as well as neighboring spectral components to the left and to the right of the spectrum component.

In another embodiment, filter 120, 220, 1018, 1118 comprises, in an embodiment, one or more processors (or one or more processing units or processing circuitry). As will be explained in more detail below, the one or more processors (or one or more processing units or processing circuitry) is configured to obtain an extended reconstructed block by extending the current reconstructed block to include one or more padding samples obtained based on at least one sample from the current reconstructed block, load a current pixel of the extended reconstructed block and its neighboring pixels of the current pixel to a linear buffer according to a predefined scan template, obtain spectrum components by performing a 1D transform for pixels in the linear buffer, obtain filtered spectrum components based on the obtained spectrum components by using a lookup table, obtain filtered pixels by performing an inverse 1D transform for the filtered spectrum components, and generate a filtered reconstructed block based on the filtered pixels. The disclosure describes an in-loop filter for lossy video codec which performs local and/or non-local filtering of a reconstructed block from a reconstructed frame. According to an example, the reconstructed frame is divided into a set of small non-overlapped rectangular macro-blocks (CU blocks). In the next step, each reconstructed macro-block (reconstructed CU block) is filtered in frequency domain independently from other reconstructed macro-blocks, in particular independently from the filtering of the other reconstructed macro-blocks. The filter can also be applied after transform and reconstruction, and the filtered result is used both for output as well as for spatial and temporal prediction.

At the first step of processing, all pixels inside a reconstructed block can be processed independently from each other. For processing of pixel r(0), neighboring pixels are used. For example, as illustrated on FIG. 3A, pixels r(1) to r(7) are used, and pixels r(0) to r(7) form one processing group.

Figure 3A:
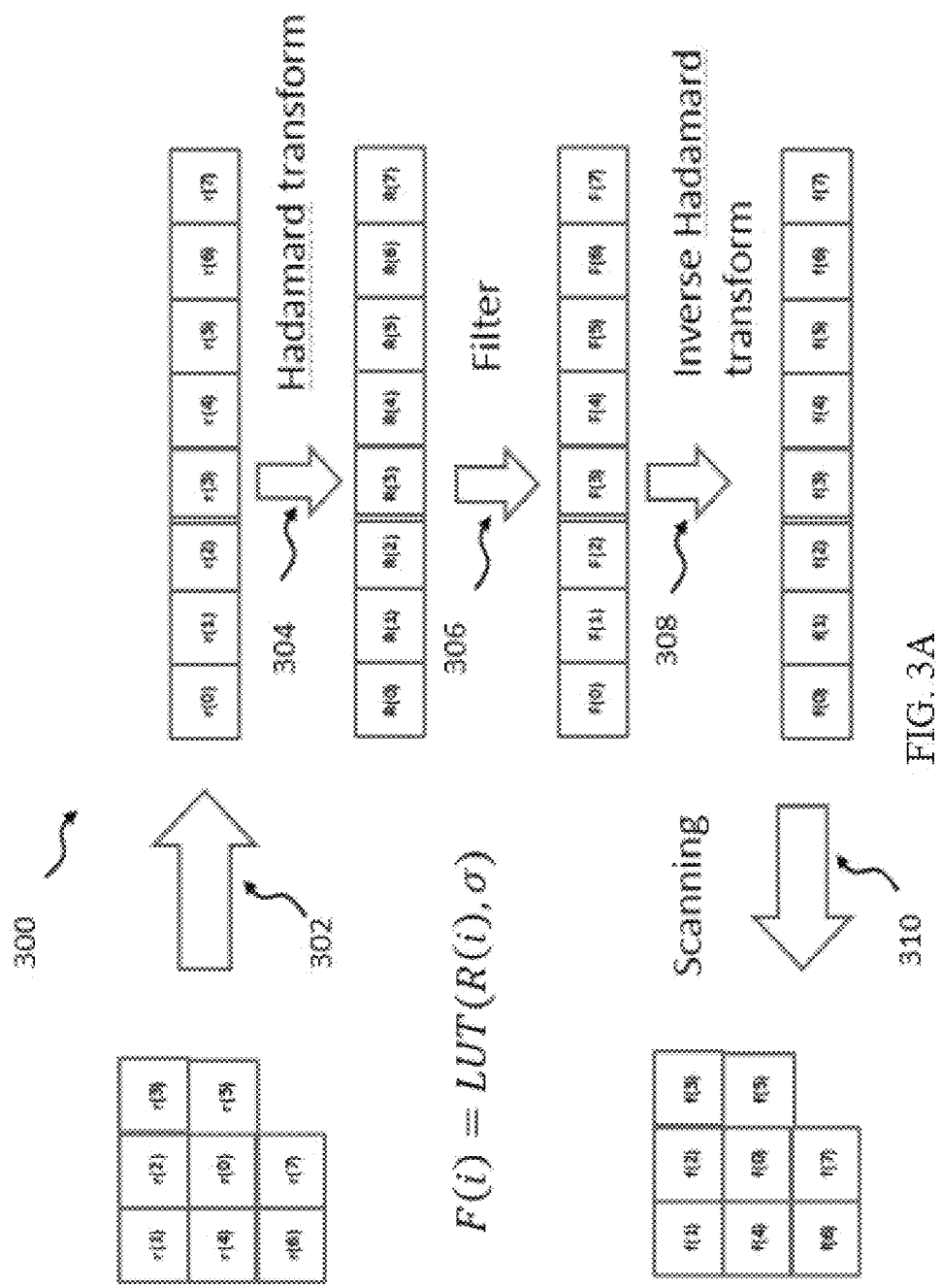
FIG. 3A shows a schematic diagram illustrating aspects of a filtering process implemented in a filter according to an embodiment.
Figure 3B:
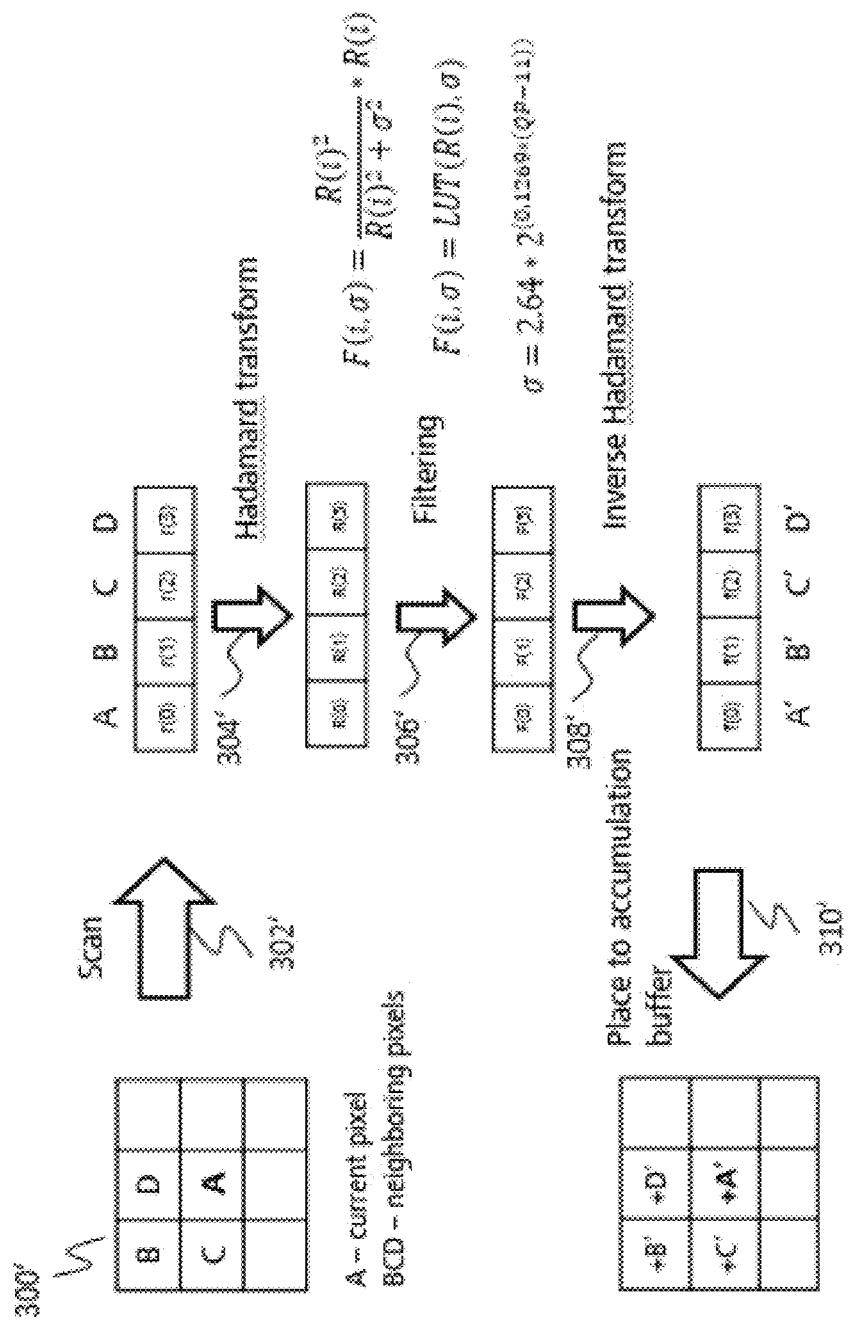
FIG. 3B shows a schematic diagram illustrating aspects of a filtering process implemented in a filter according to an embodiment.

FIG. 3A or 3B shows a schematic diagram 300 (or 300') illustrating aspects of a filtering process implemented in a filter according to an embodiment. At step 302 (or 302'), a current pixel and its neighboring pixels from a reconstructed block are loaded to a linear buffer, such as a linear buffer 116, 216, 1016, 1116 according to a predefined scan template.

At step 304 (or 304'), a 1D transform is performed for pixel r(0) and its neighboring pixels r(1) to r(7) in the linear buffer to obtain spectrum components R:

$R = 1D\_Transform(r)$.

As an example, the 1D transform may be a Hadamard transform.

At step 306 (or 306'), filtering is performed in frequency domain based on multiplication (denoted here as "*") of each spectrum component R(i) by a corresponding gain coefficient G(i, σ) to obtain a filtered spectrum components F(i): $F(i) = R(i)*G(i, \sigma)$.

The set of gain coefficients for all spectrum components is a frequency impulse response of the filter.

As described above, in an example, the gain coefficient G(i, σ) depends on the corresponding spectrum component R(i) and a filtering parameter, such as a.

In another example, the gain coefficient G(i, σ) depends on one or more filtering parameters and one or more of the corresponding spectrum components. In other example, the respective gain coefficient may depend on the one or more filtering parameters, and the corresponding spectrum component as well as neighboring spectral components to the left and to the right of the spectrum component. If each gain coefficient G(i, σ) is a function of a spectrum component of the reconstructed block and the filtering parameter, the gain coefficient G(i, σ) can be described by the following formula as an example:

$$G(i, \sigma) = \frac{R(i)^2}{R(i)^2 + m*\sigma^2},$$

where (i) is an index of a spectrum component, R(i) is the spectrum component corresponding to (i) index, G(i, σ) is the gain coefficient corresponding to R(i), σ is the filtering parameter, and m is a normalization constant equal to number of spectrum components. For example, m corresponds to the length of the 1D transformation. An exemplary and limiting value for m is 4. However, the present disclosure is applicable to any size of the 1D transformation. Different spectrum components may have a same gain coefficient, or may have different gain coefficients.

Parameter a as the filtering parameter, may be derived from a codec quantization parameter (QP) on the encoder and decoder sides, for example, using the following formula:

$\sigma = k * 2^{(n*(QP-s))}$, wherein k, n and s are constants having values as example: k=2.64, n=0.1296, s=11. These values are only exemplary and may differ in some implementations.

Different spectrum components may have a same filtering parameter, or may have different filtering parameters.

According to the method 300 as illustrated in FIG. 3A (or the method 300' in FIG. 3B), gain coefficient for each frequency is derived from spectrum component of the reconstructed pixels. Therefore, the method 300 (or 300') does not need transmission of filtering parameters and can be applied for any reconstructed block without additional signaling.

Spectrum gain coefficient is less 1, so filtering can be implemented based on a short look up table (LUT) reading according to the following formula:

$$F(i, \sigma) = \begin{cases} R(i), & Abs(R(i)) \geq THR \\ LUT(R(i), \sigma), & R(i) > 0 \\ -LUT(-R(i), \sigma), & R(i) \leq 0 \end{cases}$$

where $$LUT(R_i, \sigma) = \frac{R_i^3}{R_i^2 + m*\sigma^2},$$

(i) is an index of a spectrum component, R(i) is the spectrum component corresponding to index (i), σ is the filtering parameter, and THR is a threshold, m is normalization constant equal to number of spectrum components. F(i, σ) represents an (i)-th filtered spectrum component, filtered with a filter parameterized with the parameters σ.

As an example, THR may be calculated from following formula, where C is a value close to 1, for example, 0.9:

$$\frac{THR^2}{THR^2 + m*\sigma^2} = C.$$

After filtering in frequency domain, inverse 1D transform is performed for the filtered spectrum components F at step 308 to obtain filtered pixels f:

$f = 1D\_Inverse\_Transform(F)$

At step 310, the result of the inverse 1D transform is placed to linear buffer of filtered reconstructed pixels.

At step 312 (not shown in FIG. 3A or 3B), a filtered reconstructed block is generated based on the filtered pixels estimated in previous processing steps.

As shown in FIG. 3A as an embodiment, after filtering step 306, the filtered pixel f(0) is placed to its original position according to the predefined scan template. Other filtered samples f(1)-f(7) are not used. At another embodiment, more than one filtered pixels, for example, all filtered pixels from the linear buffer of filtered samples are added to an accumulation buffer according to the predefined scan template used at step 302 (or 302') of FIG. 3A or 3B. The accumulation buffer should be initialized by zero before the filtering step. At the last normalization step, final filtered pixels are obtained as accumulated values in the accumulation buffer divided by number of pixels added to a current position of the accumulation buffer, in other words, number of pixels values added to current position of accumulation buffer on previous processing steps. Then the filtered reconstructed block is generated based on the final filtered pixels.

If 1D Hadamard transform is used, and a filtered pixel is placed to its original position according to the predefined scan template, then the following pseudo-code describes filtering process of method 300:

```
// reconstructed pixels scan
const int x0 = pIn[p0];
const int x1 = pIn[p1];
const int x2 = pIn[p2];
const int x3 = pIn[p3];   // p0-p3 define scan pattern
// 1D forward Hadamard transform
const int y0 = x0 + x2;
const int y1 = x1 + x3;
const int y2 = x0 - x2;
const int y3 = x1 - x3;
const int t0 = y0 + y1;
const int t1 = y0 - y1;
const int t2 = y2 + y3;
const int t3 = y2 - y3;
// frequency domain filtering
const int z0 = pTbl[t0];
const int z1 = pTbl[t1];
```

```
        const int z2 = pTbl[t2];
        const int z3 = pTbl[t3];
        // backward Hadamard transform
        const int iy0 = z0 + z2;
        const int iy1 = z1 + z3;
        const int iy2 = z0 - z2;
        const int iy3 = z1 - z3;
        // output filtered pixel
        pOut[p0_out] = iy0 + iy1;
```

If 1D Hadamard transform is used, and more than one filtered pixels from linear buffer of filtered samples are added to accumulation buffer, then the following pseudo-code describes filtering process of this scenario:

```
        // reconstructed pixels scan
        const int x0 = pIn[p0];
        const int x1 = pIn[p1];
        const int x2 = pIn[p2];
        const int x3 = pIn[p3];    // p0-p3 define scan pattern
        // 1D forward Hadamard transform
        const int y0 = x0 + x2;
        const int y1 = x1 + x3;
        const int y2 = x0 - x2;
        const int y3 = x1 - x3;
        const int t0 = y0 + y1;
        const int t1 = y0 - y1;
        const int t2 = y2 + y3;
        const int t3 = y2 - y3;
        // frequency domain filtering
        const int z0 = pTbl[t0];
        const int z1 = pTbl[t1];
        const int z2 = pTbl[t2];
        const int z3 = pTbl[t3];
        // backward Hadamard transform
        const int iy0 = z0 + z2;
        const int iy1 = z1 + z3;
        const int iy2 = z0 - z2;
        const int iy3 = z1 - z3;
        // filtered pixels accumulation
        pOut[p0] += iy0 + iy1    // p0-p3 define scan pattern
        pOut[p1] += iy0 - iy1
        pOut[p2] += iy2 + iy3
        pOut[p3] += iy2 - iy3
```

As an alternative embodiment the accumulation buffer should be initialized by unfiltered pixel values multiplied by maximum number of pixel values to be added in the block. The maximum number of pixel values to be added in the block is defined based on scan template. Indeed, scan template defines number of pixel values added for each position. Based on that the maximum number from all positions in the block can be selected and used during accumulation buffer initialization. Then during each accumulation step unfiltered pixel value is subtracted from corresponding filtered value and added to accumulation buffer:

```
        // filtered pixels accumulation
        pOut[p0] += iy0 + iy1 - x0
        pOut[p1] += iy0 - iy1 - x1
        pOut[p2] += iy2 + iy3 - x2
        pOut[p3] += iy2 - iy3 - x3
```

This embodiment allows to avoid storing number of pixels added to current position and allows to replace division and multiplication by shift operation at the last normalization step and accumulation buffer initialization step correspondingly if the maximum number of pixel values added is power of 2 e.g. 2, 4, 8 etc.

For each pixel inside of a reconstructed block, a scan template is chosen based on position of filtering pixel inside reconstructed block for steps 302 and 310. Scan template is chosen to guarantee all pixels be inside reconstructed CU and placed (located) close to processing pixel. Arbitrary scan order can be used inside template. For example, the predefined scan template is defined as set of spatial or raster offsets relative to a position of the current pixel inside the reconstructed block, where offsets point to neighbor pixels are inside the reconstructed block.

It is noted that for the related part of the method 300' as illustrated in FIG. 3B, reference may be made to the method 300 as illustrated in FIG. 3A.

Figure 4A:
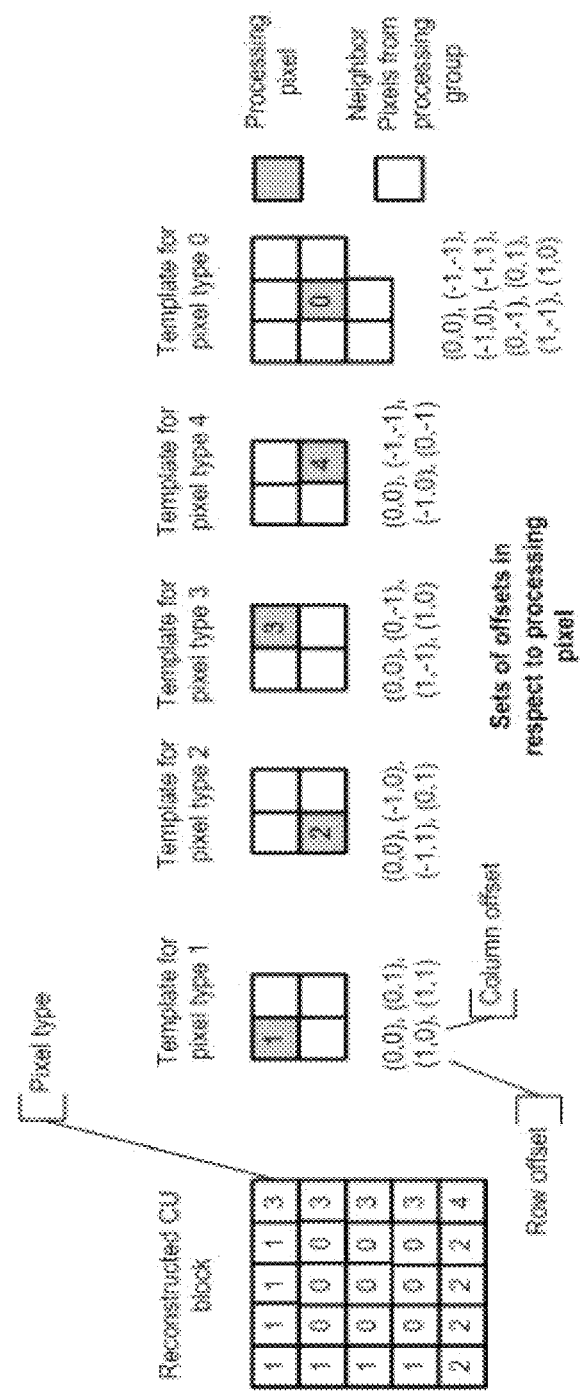
FIG. 4A illustrates templates for different pixel positions inside a square reconstructed block.

FIG. 4 illustrates templates for different pixel position inside square reconstructed block (square CU reconstructed block). According to this figure, boundary pixels can be filtered based on 4 point transform and central pixels can be filtered based on 8 point transform.

For rectangular reconstructed blocks, wherein size of one side is more size of other side the scan should be performed along long side. For example, for horizontal rectangular block the following scan order can be used:

(0,-3), (0,-2), (0,-1), (0,0), (0,1), (0,2), (0,3), (0,4), where in each pair (y, x is horizontal offset and y is vertical offset in respect to position of filtering pixel inside filtering reconstructed block.

The described filter can be selectively applied depending on conditions: for reconstructed blocks with non-zero residual signal; depending on block size, e.g. for small reconstructed block (minimal size is less than threshold); depending on an aspect ratio of the reconstructed block; depending on prediction mode (Intra or Inter) of the reconstructed block; or for any combination of described above conditions.

Filter parameter sigma and scan pattern may vary depending on conditions listed above.

Figure 4B:
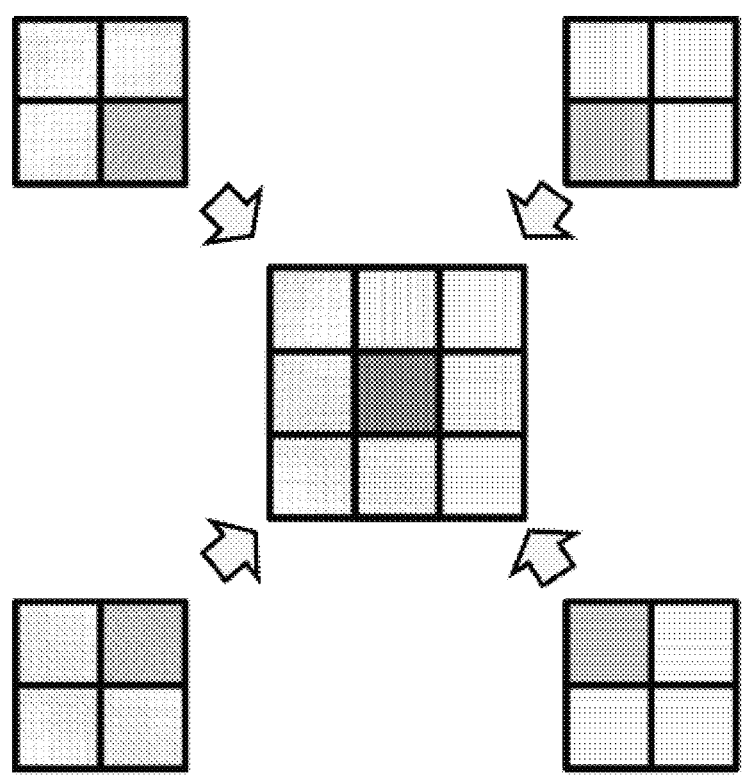
FIG. 4B illustrates an equivalent filter shape for one pixel.

FIG. 4B illustrates equivalent filter shape considering one pixel inside of current block for exemplary scan template (0,0), (0,1), (1,0), (1,1). For the filtering of current pixel square area of 3×3 pixels is used (current pixel is marked by dark-gray color in the center of 3×3 square). Filtered pixel is obtained by combining transform domain filtered samples from four 2×2 processing groups, in other words, filtered pixel is obtained by combining transform domain filtered samples from four processing groups, where each processing group being the shape/size of 2×2. It can be understood that if current pixel is located in block border (e.g. top border) top left and top right 2×2 processing groups are unavailable and only two 2×2 processing groups (bottom left and bottom right) can be used for filtering. Furthermore, if current pixel is located in block corner (e.g. top-left corner) only one 2×2 processing group (bottom right) can be used for filtering.

Figure 7:
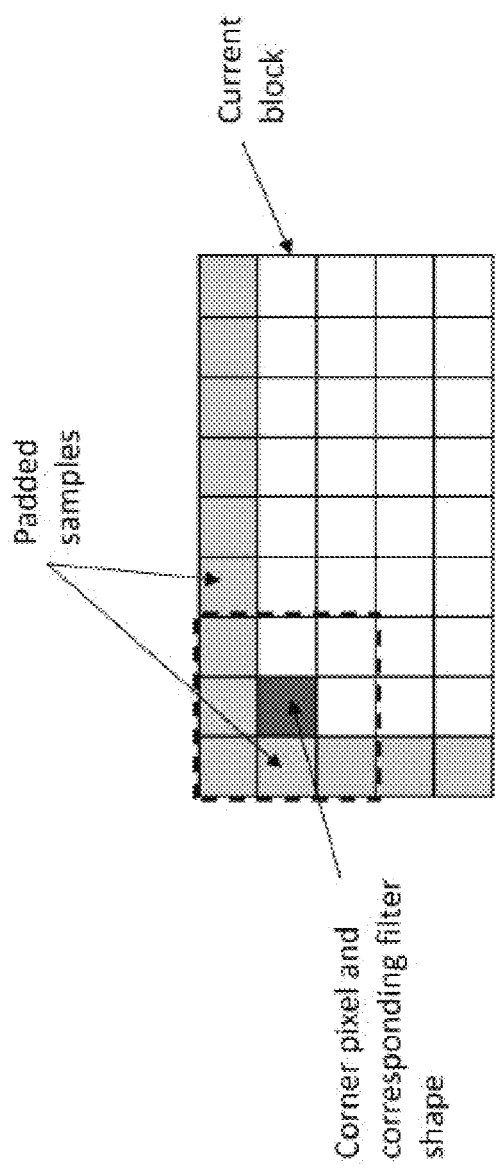
FIG. 7 illustrates padding on left and top sides.

To increase quality of filtering near block edges and unify processing by using same 2×2 groups for border and corner pixels, the current block can be padded by additional samples. FIG. 7 gives an example of padding on left and top sides. In particular, FIG. 7 shows a current block including the 4×8 pixels (samples) with a highlighted top left corner pixel of the current block. It is noted that herein, reference is generally made to a current block. However, in case of application of the filter for encoding and/or decoding of video, the current block is referred more particularly as a current reconstructed block. This is because the filtering is typically applied during the encoding and/or during the decoding after reconstruction as was already briefly explained with reference to FIGS. 1 and 2 above. FIG. 7 further illustrated padded samples which are padded on the top side of the current block and on the left side of the current block. The padded samples facilitates application of the filter (indicated by a dashed line in FIG. 7) to pixels (samples of the current block) located at the boundary of the current block. Pixels located at the boundary of the current block can be regarded as outer pixels of the current block or as pixels which have one or more neighboring pixels that do not belong to the same (current) block or which do not have neighboring pixels at all (e.g. because they are located at the picture border).

Padding samples can be taken from already reconstructed blocks such as blocks adjacent to the current block (e.g. neighboring blocks). It should be noted that depending on processing group shape (e.g. 2×2 or 3×3), one or more padding lines can be used. For instance, for a 2×2 processing group, one line of padding on each side is used. For a 3×3 processing group, two lines of padding on each side are used.

It can be understood that padding samples are those used for padding. After they are padded, then they are padded samples.

Figure 8:
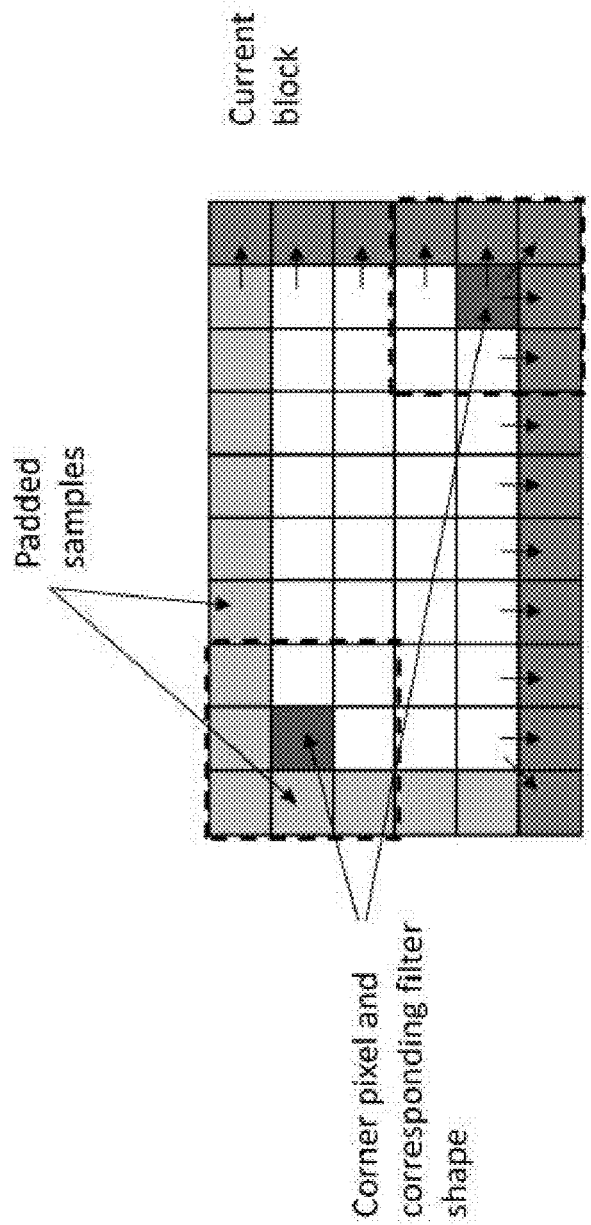
FIG. 8 illustrates padding on left, top, right and bottom sides.

For further unification of the filtering process for all pixels in a block (e.g. four 2×2 processing groups are used for filtering of all pixels in a current block), in addition to top-left padding, a current block can also be extended by bottom-right padding as illustrated in FIG. 8. Unification of filtering is beneficial due to simplifying implementation by excluding special processing cases for corner pixels and/or border pixels.

Figure 12:
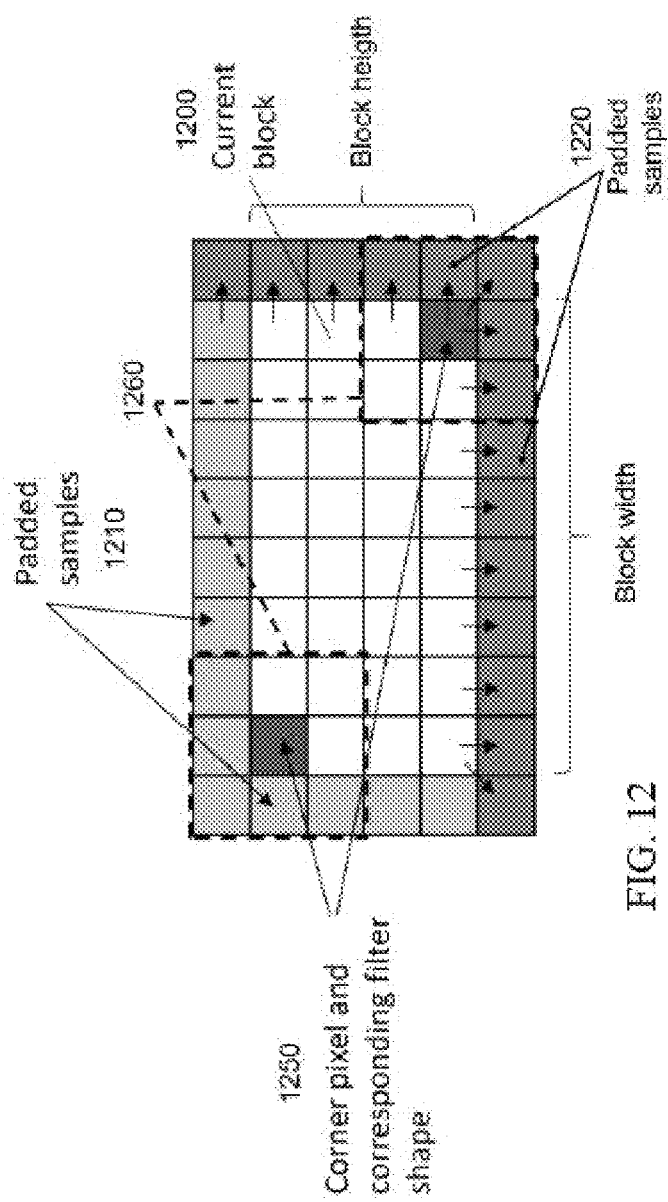
FIG. 12 is a schematic drawing illustrating padding on left, top, right and bottom sides and filtering using the padded samples.

FIG. 8 shows a current block of 4×8 pixels, similar to the current block of FIG. 7. In addition to FIG. 7, FIG. 8 shows padded samples on the bottom side of the current block and on the right side of the current block, including the bottom right corner pixel. FIG. 12 is based on FIG. 8 and includes further clarification. The dashed square 1260 with the bottom right corner pixel in the center illustrates filtering with a 3×3 filter similar to the filter applied to the top left corner. As can be seen, the padded samples are used in the filtering, e.g. are used to derive the filtered bottom right sample and/or the top left sample 1250. The current block 1200 here is extended on all its for sides by padded samples 1210 and 1220. The padded samples 1210 and 1220 are samples on the outer border of the current block 1200, in particular one line of samples on the outer border of the current block. As mentioned above, padded samples may extend the current block by more than one line of samples on each of the four sides (top, bottom, right, left).

Padding samples are preferably taken from adjacent neighboring samples from already reconstructed blocks. In state-of-the-art video codecs those already reconstructed blocks can be located either on left or top side from current block or on right or bottom side depending on block reconstruction order. Using more information from adjustment samples, it improves filtering quality and makes transition between blocks more smooth. It is noted that the present disclosure is not limited to any particular block scanning order. In general, neighboring samples from any available neighboring block may be used. The availability may be given by the block scan order. In particular, the block scan order may correspond to the processing (e.g. reconstruction) order of the blocks. In other words, the block scanning order may define which blocks have been previously reconstructed (available) at the time at which the current block is filtered.

Retrieving reconstructed samples from adjacent blocks or previously reconstructed blocks can require additional memory load for hardware or software implementation. To minimize or exclude additional memory, it is beneficial to use samples intended for intra prediction of current block which are commonly taken from one, two or more rows and columns from neighboring blocks adjacent to current block borders. These samples are usually stored in fast memory (also known as "line" buffer) for easy access for intra prediction and called reference samples of intra prediction.

It should be further noted that in some implementation, before performing intra prediction, reference sample (intra reference samples) are pre-processed (e.g. filtered) before prediction e.g. by smoothing, sharpening, de-ringing or bilateral filtering. In this case it may be beneficial to use pre-processed samples for padding of current block.

If some samples in the padded area are not available, due to order of adjacent block reconstruction, or a location of the current block relative to a picture boundary/slice boundary/tile boundary or tile group boundary, required samples can be padded from the current block expanding border pixels to the padded area as illustrated on FIG. 8 and FIG. 12. In particular, FIG. 12, padded samples 1220 are obtained by expanding bottom border pixels and right border pixels to the padded area. This may be beneficial, e.g., in a scenario in which the bottom neighboring block and the right neighboring block are not available for the current block 1200 (e.g. are not yet reconstructed, belong to another tile than the current block, or are located at the picture border). Padded samples 1210 may be obtained from the neighboring blocks.

In other words, the padding process includes checking of availability of neighboring samples. If a neighboring sample is available, then sample (the available neighboring sample) is used for padding. Otherwise, a sample of the current block is used for padding. For example, given a pixel position in the area to be padded, the pixel position may be padded with a sample from the current block, the sample being located closest (among the samples of the current block) to the given pixel position.

Logic of neighboring samples availability checking can be same as for intra reference samples derivation process. The example of intra reference samples (p[x][y]) derivation process including Clause 6.4.1 (Derivation process for neighboring block availability checking) is as follows:

When sps_suco_flag is equal to 1, the following applies:

The nCbW*3+nCbH*4+2 neighboring samples p[x][y] that are constructed samples after post-reconstruction filtering process and/or prior to the in-loop filter process, with x=−1, y=−1 . . . nCbH+nCbW−1, x=0 . . . nCbW+nCbH−1, y=−1, x=nCbW, y=−1 . . . nCbH+nCbW−1 and x=−nCbH . . . −1, y=−1, are derived as follows:

The neighboring location (xNbCmp, yNbCmp) is specified as follows:

$$(xNbCmp, yNbCmp) = (xCbCmp + x, yCbCmp + y) \quad (8\text{-}1)$$

The current luma location (xCbY, yCbY) and the neighboring luma location (xNbY, yNbY) are derived as follows:

$$(xCbY, yCbY) = (cIdx == 0)?(xCbCmp, yCbCmp): \\ (xCbCmp * SubWidthC, yCbCmp * SubHeightC) \quad (8\text{-}2)$$

$$(xNbY, yNbY) = (cIdx == 0)?(xNbCmp, yNbCmp): \\ (xNbCmp * SubWidthC, yNbCmp * SubHeightC) \quad (8\text{-}3)$$

The availability derivation process for a block in z-scan order as specified in clause 6.4.1 is invoked with the current luma location (xCurr, yCurr) set equal to (xCbY, yCbY) and the neighboring luma location (xNbY, yNbY) as inputs, and the output is assigned to availableN.

Each sample p[x][y] is derived as follows:

If the variable availableN is equal to FALSE, the sample p[x][y] is marked as "not available for intra prediction", the following applies:

Otherwise (the variable availableN is equal to TRUE), the sample p[x][y] is marked as "available for intra prediction" and the sample at the location (xNbCmp, yNbCmp) is assigned to p[x][y].

When at least one sample p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1 is marked as "not available for intra prediction", the reference sample substitution process for intra sample prediction in clause 8.4.4.2 is invoked with the samples p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1, nCbW, nCbH and cIdx as inputs, and the modified samples p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1 as output.

Otherwise, when sps_suco_flag is equal to 0, the following applies:

The nCbW*2+nCbH*2+1 neighboring samples p[x][y] that are constructed samples prior to the in-loop filtering process, with x=−1, y=−1 . . . nCbH+nCbW−1 and x=0 . . . nCbW+nCbH−1, y=−1, are derived as follows:

The neighboring location (xNbCmp, yNbCmp) is specified as follows:

$$(xNbCmp, yNbCmp) = (xCbCmp+x, yCbCmp+y) \quad (8-4)$$

The current luma location (xCbY, yCbY) and the neighboring luma location (xNbY, yNbY) are derived as follows:

$$(xCbY, yCbY) = (cIdx==0)?(xCbCmp, yCbCmp): \\ (xCbCmp*SubWidthC, yCbCmp*SubHeightC) \quad (8-5)$$

$$(xNbY, yNbY) = (cIdx==0)?(xNbCmp, yNbCmp): \\ (xNbCmp*SubWidthC, yNbCmp*SubHeightC) \quad (8-6)$$

The availability derivation process for a block in z-scan order as specified in clause 6.4.1 is invoked with the current luma location (xCurr, yCurr) set equal to (xCbY, yCbY) and the neighboring luma location (xNbY, yNbY) as inputs, and the output is assigned to availableN.

Each sample p[x][y] is derived as follows:

If the variable availableN is equal to FALSE, the sample p[x][y] is marked as "not available for intra prediction", the following applies:

Otherwise (the variable availableN is equal to TRUE), the sample p[x][y] is marked as "available for intra prediction" and the sample at the location (xNbCmp, yNbCmp) is assigned to p[x][y].

When at least one sample p[x][y] with x=−1, y=−1 . . . nCbH+nCbW−1 and x=0 . . . nCbW+nCbH−1, y=−1 is marked as "not available for intra prediction", the reference sample substitution process for intra sample prediction in clause 8.4.4.2 is invoked with the samples p[x][y] with x=−1, y=−1 . . . nCbH+nCbW−1 and x=0 . . . nCbW+nCbH−1, y=−1, nCbW, nCbH and cIdx as inputs, and the modified samples p[x][y] with x=−1, y=−1 . . . nCbH+nCbw−1 and x=0 . . . nCbW+nCbH−1, y=−1 as output.

Clause 6.4.1 Derivation Process for Neighboring Block Availability.

Inputs to this process are: the luma location (xCurr, yCurr) of the top-left sample of the current block relative to the top-left luma sample of the current picture, the luma location (xNbY, yNbY) covered by a neighboring block relative to the top-left luma sample of the current picture.

Output of this process is the availability of the neighboring block covering the location (xNbY, yNbY), denoted as availableN.

The neighboring block availability availableN is derived as follows:

If the neighboring block is contained in a different tile than the current block, availableN is set equal to FALSE If the neighboring block is prior to the current block in the coding order, availableN is set equal to FALSE As can be seen from example above, the Clause 6.4.1 'Derivation process for neighboring block availability' may be used for intra reference samples derivation. Same or similar process can be availability checking during padding process. This advantageously saves implementation cost due to reusing logic between two modules. Below is an exemplary logic of a padding process specified as follows:

Inputs to this process are: a location (xCb, yCb) specifying the top-left sample of the current luma block relative to the top-left sample of the current picture, two variables nCbW and nCbH specifying the width and the height of the current luma coding block, an array recSamples specifying the reconstructed luma samples of the current block.

The output array of padded reconstructed luma samples of the current block recSamplesPad[x][y] with x=−1 . . . nCbW, y=−1 . . . nCbH are derived as follows:

When 0≤x≤nCbW−1 and 0≤y≤nCbH−1, the following applies: recSamplesPad[x][y]=recSamples[x][y]

Otherwise, the availability derivation process for a block in z-scan order as specified in clause 6.4.1 is invoked with the current luma location (xCurr, yCurr) set equal to (xCb, yCb) and the neighboring luma location (xNbY, yNbY) set equal to (xCb+x, yCb+y) as inputs, and the output is assigned to availableN.

The variable dx is set to 0 and variable dy is set to 0, when x==−1 and availableN is equal to FALSE, dx=1, when x==nCbW and availableN is equal to FALSE, dx=−1, when y==−1 and availableN is equal to FALSE, dy=1, when y==nCbH and availableN is equal to FALSE, dy=−1, recSamplesPad[x][y]=recSamples[x+dx][y+dy].

Where samples at position x<0 or x>=nCbW or y<0 or y>=nCbH belong to neighboring blocks and where availability derivation process defines whether a neighboring block is available for a current block based on e.g. blocks coding order, the current and neighboring blocks belonging to same slice, tile, tile group, location of neighboring block beyond picture boundary. "availableN" indicates the availability of the corresponding neighboring block. Variables dx and dy are used to specify samples from the current block used for padding of pixel positions in the padding area when the neighboring samples in the padding area are not available (availableN=false).

For example, when x==−1, the left side of the current block is padded. If availableN is equal to FALSE for the left side, dx is set to 1 (dx=1). Then, the recSamplesPad[−1][y] in x with value −1, i.e. padding area to the left of the current block, is assigned samples from the current block, namely recSamples[0][y+dy], i.e. samples from the current block in the first vertical line, i.e. on the left border of the current block.

Similarly, when x==nCbW, then dx=−1, and the current block is extended on its right side. In particular, nCbW-th line (neighboring to the current block on the right) is padded with samples from the (nCbW−1)-th line, which is the last line of the current block and which includes samples from the right border of the current block.

When y==−1, then dy=1, and the current block is extended on its top side. In particular, (−1)-th line (neighboring to the current block on the top) is padded with samples from the 0-th line, which is the first line of the current block and which includes samples from the top border of the current block.

When y==nCbH, then dy=−1, and the current block is extended on its bottom side. In particular, (nCbH)-th line (neighboring to the current block on the bottom) is padded with samples from the (nCbH−1)-th line, which is the last line of the current block and which includes samples from the bottom border of the current block.

When particular sample from an adjacent block is available (availableN=true) the variables dx and dx remain equal to 0, as initialized. And by using equation recSamplesPad [x][y]=recSamples[x+dx][y+dy], for x<0 and x>=nCbW and y<0 and y>=nCbH, samples for adjacent blocks are taken.

In other words, the obtaining of the extended (reconstructed) block includes extending the current (reconstructed) block to include on each side (left, right, top, bottom) of the current reconstructed block neighboring reconstructed samples from a neighboring reconstructed block adjacent to the current reconstructed block on said side (left, right, top, bottom), if said neighboring reconstructed block is available, or the closest samples from the current reconstructed block otherwise.

It is noted that the present disclosure is not limited to the detailed exemplary implementation described above. In particular, the exemplary variables and conditions serve only as a detailed example. For example, the checking may be based on other additional or alternative conditions. For example, the checking may be based on other additional or alternative variables and parameters. Moreover, the present disclosure may implement derivation of availability in any manner which may be adapted to some particular parameters of the codec.

For example, it is determined whether a corresponding neighboring block is available for a current block based on the blocks coding order. In another example, a corresponding neighboring block is available for a current block in the case that the current and neighboring blocks belonging to same slice, tile, tile group. In another example, a corresponding neighboring block is not available for a current block in the case that the location of neighboring block beyond picture boundary.

The block coding order may be regarded as block encoding and/or block decoding order which may be regarded as block reconstruction order, since both encoding and decoding apply reconstruction to blocks. As mentioned above, the block reconstruction order corresponds to block scanning order, i.e. to the order in which the blocks of a picture are scanned for processing (encoding, decoding, reconstruction).

In some implementation of the present disclosure, neighboring samples availability checking for padding process may be different for filtering of inter and intra blocks. For inter blocks it may further check whether available samples belong to intra or inter predicted blocks. If samples belong to inter predicted blocks, it can be used for padding, otherwise it cannot be used for padding. It may be beneficial for some hardware implementation when intra and inter blocks are reconstructed in different pipelines with using of different operating memory. Using neighboring samples coming only from inter blocks during inter blocks post-reconstruction filtering allows to avoid dependency between different pipelines, that simplifies logic and speedups overall processing pipeline.

To perform intra prediction, the state-of-art decoders usually comprise an intra reference sample derivation unit (or process) that are used as a source for intra prediction. The intra reference samples derivation unit (or process) may include logic that performs checking of availability of neighboring samples (adjacent to the current block or even more distant e.g. like in multiple reference line prediction technique). If a sample is available, then it is included into reference samples. Otherwise, it is substituted by a neighboring available sample. In some advantageous implementation, padding process for filtering may re-use results of the intra reference sample derivation unit (or process) like it is illustrated on FIG. 9. That reduces implementation cost allowing to use same logic of derivation both for intra prediction and for filter padding.

Figure 9:
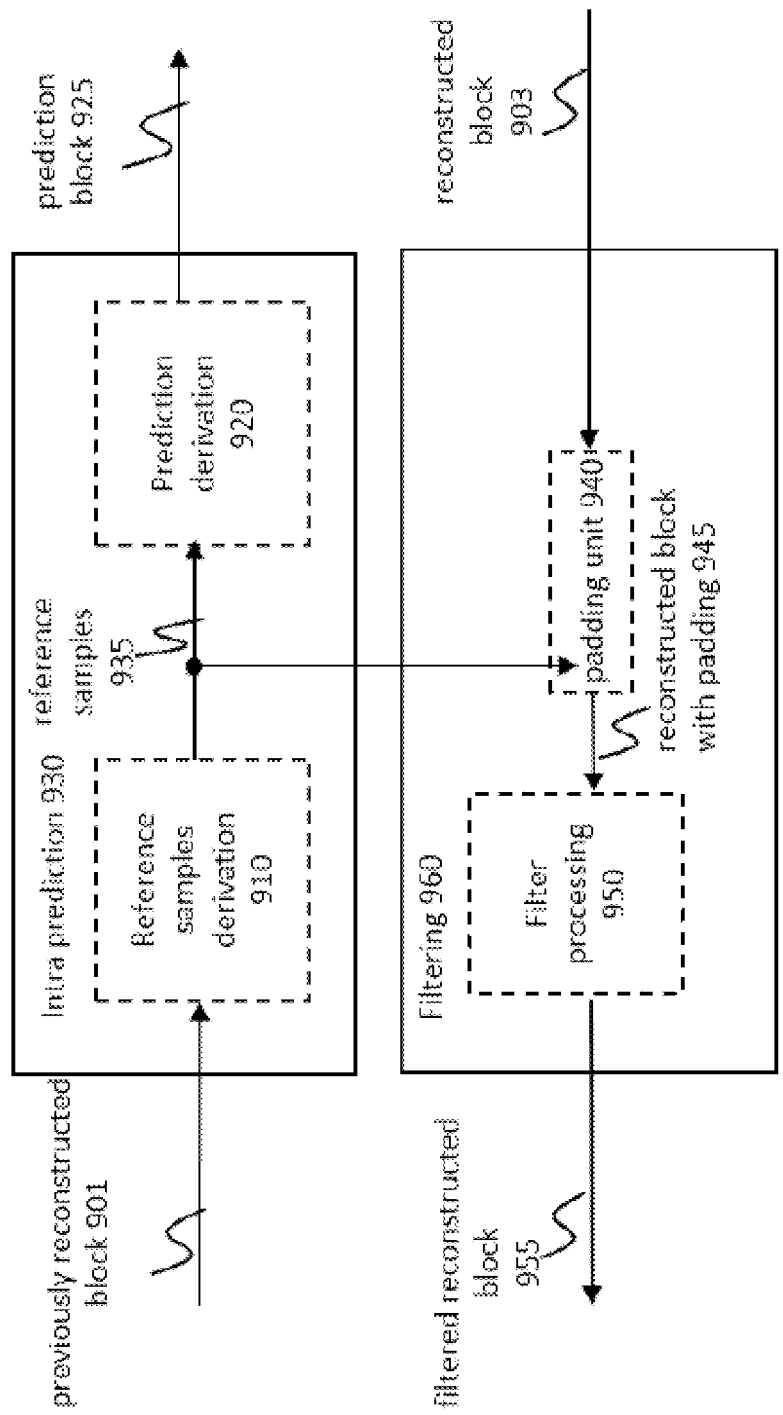
FIG. 9 illustrates an exemplary structure of an apparatus according to another embodiment.

FIG. 9 is a block diagram illustrating an embodiment of the present disclosure. In particular, FIG. 9 shows an intra-prediction unit (module) 930. The intra prediction unit 930 may be implemented, for example as 154 in FIG. 1, 254 in FIG. 2, 1054 in FIG. 10, and/or 1154 in FIG. 11. The intra prediction unit 930 includes a reference samples derivation unit (module) 910 and a prediction derivation unit 920. In particular, a previously reconstructed block 901 is entered to the reference sample derivation unit 910. This unit is configured to derive/determine reference samples 935. The reference samples 935 are samples which may then be used for deriving a prediction for a current block by a prediction derivation unit 920. The prediction derivation unit 920 then outputs the prediction block 925. It is noted that the term "previously reconstructed block" 901 here refers to a block (typically a neighboring block of the current block) which is used to predict the current block and which is available. Furthermore, the previously reconstructed block has been reconstructed before the reconstruction (and before the prediction) of the current block.

In these exemplary embodiments, the reference samples 935 derived for the prediction derivation unit 920, are re-used, i.e. are passed to a padding unit 940. Another input to the padding unit 940 is a (current) reconstructed block 903. the current reconstructed block includes samples of the current block reconstructed e.g. by intra prediction 920. The padding unit extends the current reconstructed block 903 to include the reference samples 935. The extended reconstructed block 945 is then provided for filtering by a filter processing unit/module 950. The output of the filtering processing 950 is a filtered reconstructed block 955.

The filtering processing module 950 and the padding unit 940 may be both considered as a part of a filter unit/module 960. In the present disclosure, the filter unit/module 960 may correspond to the filter 120, 220, 1018, 1118 and the structure of the filter 120, 220, 1018, 1118 include and is not limited to the exemplary implementation described above.

Below is an example of intra reference samples (p[x][y]) derivation process including Clause 6.4.1 ('Derivation process for neighboring block availability' checking) and clause 8.4.4.2 (Reference sample substitution process' for not available samples) is as follows:

Clause 8.4.4.2 Reference Sample Substitution Process for Intra Sample Prediction:

When sps_suco_flag is equal to 1, the following applies:

The nCbW*3+nCbH*4+2 neighboring samples p[x][y] that are constructed samples after post-reconstruction filtering process and/or prior to the in-loop filter process, with x=−1, y=−1 . . . nCbH+nCbW−1, x=0 . . . nCbW+nCbH−1, y=−1, x=nCbW, y=−1 . . . nCbH+nCbW−1 and x=−nCbH . . . −1, y=−1, are derived as follows:

The neighboring location (xNbCmp, yNbCmp) is specified as follows:

$$(xNbCmp, yNbCmp) = (xCbCmp + x, yCbCmp + y). \quad (8\text{-}7)$$

The current luma location (xCbY, ycbY) and the neighboring luma location (xNbY, yNbY) are derived as follows:

$$(xCbY, yCbY) = (cIdx == 0)?(xCbCmp, yCbCmp): \\ (xCbCmp*\text{SubWidth}C, yCbCmp*\text{SubHeight}C). \quad (8\text{-}8)$$

$$(xNbY, yNbY) = (cIdx == 0)?(xNbCmp, yNbCmp): \\ (xNbCmp*\text{SubWidth}C, yNbCmp*\text{SubHeight}C). \quad (8\text{-}9)$$

The availability derivation process for a block in z-scan order as specified in clause 6.4.1 is invoked with the current luma location (xCurr, yCurr) set equal to (xCbY, yCbY) and the neighboring luma location (xNbY, yNbY) as inputs, and the output is assigned to availableN.

Each sample p[x][y] is derived as follows:

If the variable availableN is equal to FALSE, the sample p[x][y] is marked as "not available for intra prediction", the following applies:

Otherwise (the variable availableN is equal to TRUE), the sample p[x][y] is marked as "available for intra prediction" and the sample at the location (xNbCmp, yNbCmp) is assigned to p[x][y].

When at least one sample p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1 is marked as "not available for intra prediction", the reference sample substitution process for intra sample prediction in clause 8.4.4.2 is invoked with the samples p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1, nCbW, nCbH and cIdx as inputs, and the modified samples p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1 as output.

Otherwise, when sps_suco_flag is equal to 0, the following applies:

The nCbW*2+nCbH*2+1 neighboring samples p[x][y] that are constructed samples prior to the in-loop filtering process, with x=−1, y=−1 . . . nCbH+nCbW−1 and x=0 . . . nCbW+nCbH−1, y=−1, are derived as follows:

The neighboring location (xNbCmp, yNbCmp) is specified as follows:

$$(xNbCmp, yNbCmp) = (xCbCmp + x, yCbCmp + y). \quad (8\text{-}10)$$

The current luma location (xCbY, yCbY) and the neighboring luma location (xNbY, yNbY) are derived as follows:

$$(xCbY, yCbY) = (cIdx == 0)?(xCbCmp, yCbCmp): \\ (xCbCmp*\text{SubWidth}C, yCbCmp*\text{SubHeight}C). \quad (8\text{-}11)$$

$$(xNbY, yNbY) = (cIdx == 0)?(xNbCmp, yNbCmp): \\ (xNbCmp*\text{SubWidth}C, yNbCmp*\text{SubHeight}C). \quad (8\text{-}12)$$

The availability derivation process for a block in z-scan order as specified in clause 6.4.1 is invoked with the current luma location (xCurr, yCurr) set equal to (xCbY, yCbY) and the neighboring luma location (xNbY, yNbY) as inputs, and the output is assigned to availableN.

Each sample p[x][y] is derived as follows:

If the variable availableN is equal to FALSE, the sample p[x][y] is marked as "not available for intra prediction", the following applies:

Otherwise (the variable availableN is equal to TRUE), the sample p[x][y] is marked as "available for intra prediction" and the sample at the location (xNbCmp, yNbCmp) is assigned to p[x][y].

When at least one sample p[x][y] with x=−1, y=−1 . . . nCbH+nCbW−1 and x=0 . . . nCbW+nCbH−1, y=−1 is marked as "not available for intra prediction", the reference sample substitution process for intra sample prediction in clause 8.4.4.2 is invoked with the samples p[x][y] with x=−1, y=−1 . . . nCbH+nCbW−1 and x=0 . . . nCbW+nCbH−1, y=−1, nCbW, nCbH and cIdx as inputs, and the modified samples p[x][y] with x=−1, y=−1 . . . nCbH+nCbw−1 and x=0 . . . nCbW+nCbH−1, y=−1 as output.

Clause 6.4.1 Derivation Process for Neighboring Block Availability:

Inputs to this process are: the luma location (xCurr, yCurr) of the top-left sample of the current block relative to the top-left luma sample of the current picture, the luma location (xNbY, yNbY) covered by a neighboring block relative to the top-left luma sample of the current picture.

Output of this process is the availability of the neighboring block covering the location (xNbY, yNbY), denoted as availableN.

The neighboring block availability availableN is derived as follows:

If the neighboring block is contained in a different tile than the current block, availableN is set equal to FALSE If the neighboring block is prior to the current block in the coding order, availableN is set equal to FALSE Clause 8.4.4.2 Reference Sample Substitution Process for Intra Sample Prediction:

Inputs to this process are: reference samples p[x][y] with x=−1, y=−1 . . . nCbH+nCbW−1 and x=0 . . . nCbW+nCbH−1, y=−1 for intra sample prediction, and with x=nCbW, y=−1 . . . nCbH+nCbW−1 and x=−nCbH . . . −1, y=−1 if sps_suco_flag is equal to 1, variables nCbW and nCbH specifying the width and height of the current coding block, a variable cIdx specifying the colour component of the current coding block.

Outputs of this process are the modified reference samples p[x][y] with x=−1, y=−1 . . . nCbH+nCbW−1 and x=0 . . . nCbW+nCbH−1, y=−1 for intra sample prediction, and with x=nCbW, y=−1 . . . nCbH+nCbW−1 and x=−nCbH . . . −1, y=−1 if sps_suco_flag is equal to 1.

The variable bitDepth is derived as follows:

If cIdx is equal to 0, bitDepth is set equal to $BitDepth_Y$.

Otherwise, bitDepth is set equal to $BitDepth_C$.

When sps_suco_flag is equal to 1, the following applies:

The values of the samples p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1 are modified as follows:

If all samples p[x][y] with x=−1, y=−1 . . . nCbH+nCbW−1 and x=0 . . . nCbW+nCbH−1, y=−1 and x=nCbW, y=−1 . . . nCbH+nCbW−1 and x=−nCbH . . . −1, y=−1 are marked as "not available for intra prediction", the value 1<<(bitDepth−1) is substituted for the values of all samples p[x][y].

Otherwise (at least one but not all samples p[x][y] are marked as "not available for intra prediction"), the following ordered steps are applied:

1. If p[0][−1] is marked as "not available for intra prediction", the value 1<<(bitDepth−1) is substituted for the values of samples p[x][y] with x=−nCbH . . . nCbW+nCbH−1, y=−1.

2. Otherwise (p[0][−1] is marked as "available for intra prediction"), the following applies:

Search sequentially starting from x=nCbW, y=−1 to x=nCbW+nCbH−1, y=−1. Once a sample p[x][y] marked as "not available for intra prediction", the search is terminated and the value of p[x−1][y] is assigned from p[x][y] to p[nCbW+nCbH−1][y].

If p[−1][−1] is marked as "not available for intra prediction", the value p[0][−1] is substituted for the values of samples p[x][y] with x=−nCbH . . . −1, y=−1.

Otherwise (p[−1][−1] is marked as "available for intra prediction"), search sequentially starting from x=−1, y=−1 to x=−nCbH, y=−1. Once a sample p[x][y] is marked as "not available for intra prediction", the search is terminated and the value of p[x+1][y] is assigned from [x][y] to p[−nCbH][y].

1. If p[−1][0] is marked as "not available for intra prediction", the following applies:

If p[−1][−1] is marked as "not available for intra prediction", the value 1<<(bitDepth−1) is substituted for the values of samples p[x][y] with x=−1, y=−1 . . . nCbH+nCbW−1.

Otherwise, p[−1][−1] is substituted for the values of samples p[x][y] with x=−1, y=−1 . . . nCbH+nCbW−1.

2. Otherwise (p[−1][0] is marked as "available for intra prediction"), search sequentially starting from x=−1, y=0 to x=−1, y=nCbH+nCbW−1. Once a sample p[x][y] marked as "not available for intra prediction", the search is terminated and the value of p[x][y−1] is assigned from p[x][y] to p[x][nCbH+nCbW−1].

3. If p[nCbW][0] is marked as "not available for intra prediction", the following applies:

If p[nCbW][−1] is marked as "not available for intra prediction", the value 1<<(bitDepth−1) is substituted for the values of samples p[x][y] with x=nCbW, y=−1 . . . nCbH+nCbW−1.

Otherwise, p[nCbW][−1] is substituted for the values of samples p[x][y] with x=nCbW, y=−1 . . . nCbH+nCbW−1.

4. Otherwise (p[nCbW][0] is marked as "available for intra prediction"), search sequentially starting from x=nCbW, y=0 to x=nCbW, y=nCbH+nCbW−1. Once a sample p[x][y] marked as "not available for intra prediction", the search is terminated and the value of p[x][y−1] is assigned from p[x][y] to p[x][nCbH+nCbW−1].

Otherwise, when sps_suco_flag is equal to 0, the following applies:

The values of the samples p[x][y] with x=−1, y=−1 . . . nCbH+nCbW−1 and x=0 . . . nCbW+nCbH−1, y=−1 are modified as follows:

If all samples p[x][y] with x=−1, y=−1 . . . nCbH+nCbW−1 and x=0 . . . nCbW+nCbH−1, y=−1 are marked as "not available for intra prediction", the value 1<<(bitDepth−1) is substituted for the values of all samples p[x][y].

Otherwise (at least one but not all samples p[x][y] are marked as "not available for intra prediction"), the following ordered steps are applied:

1. If p[0][−1] is marked as "not available for intra prediction", the value 1<<(bitDepth−1) is substituted for the values of samples p[x][y] with x=0 . . . nCbW+nCbH−1, y=−1.

2. Otherwise (p[0][−1] is marked as "available for intra prediction", search sequentially starting from x=nCbW, y=−1 to x=nCbW+nCbH−1, y=−1. Once a sample p[x][y] marked as "not available for intra prediction", the search is terminated and the value of p[x−1][y] is assigned from p[x][y] to p[nCbW+nCbH−1][y].

3. When p[−1][0] is marked as "not available for intra prediction", the following applies:

If p[−1][−1] is marked as "not available for intra prediction", the value 1<<(bitDepth−1) is substituted for the values of samples p[x][y] with x=−1, y=−1 . . . nCbH+nCbW−1.

Otherwise, p[−1][−1] is substituted for the values of samples p[x][y] with x=−1, y=−1 . . . nCbH+nCbW−1.

4. Otherwise, search sequentially starting from x=−1, y=0 to x=−1, y=nCbH+nCbW−1. Once a sample p[x][y] marked as "not available for intra prediction", the search is terminated and the value of p[x][y−1] is assigned from p[x][y] to p[x][nCbH+nCbW−1].

As can be seen from example above, the intra reference samples (p[x][y]) derivation process may be substantially complex. Thus using output of this process (p[x][y]) for filling padding of the current advantageously saves implementation cost due to reusing of logic between two modules.

It is noted that in the present disclosure, previously reconstructed adjacent block means closest neighbor, e.g. sharing border with current block. Previously reconstructed means reconstructed before reconstructing current block.

Figure 5:
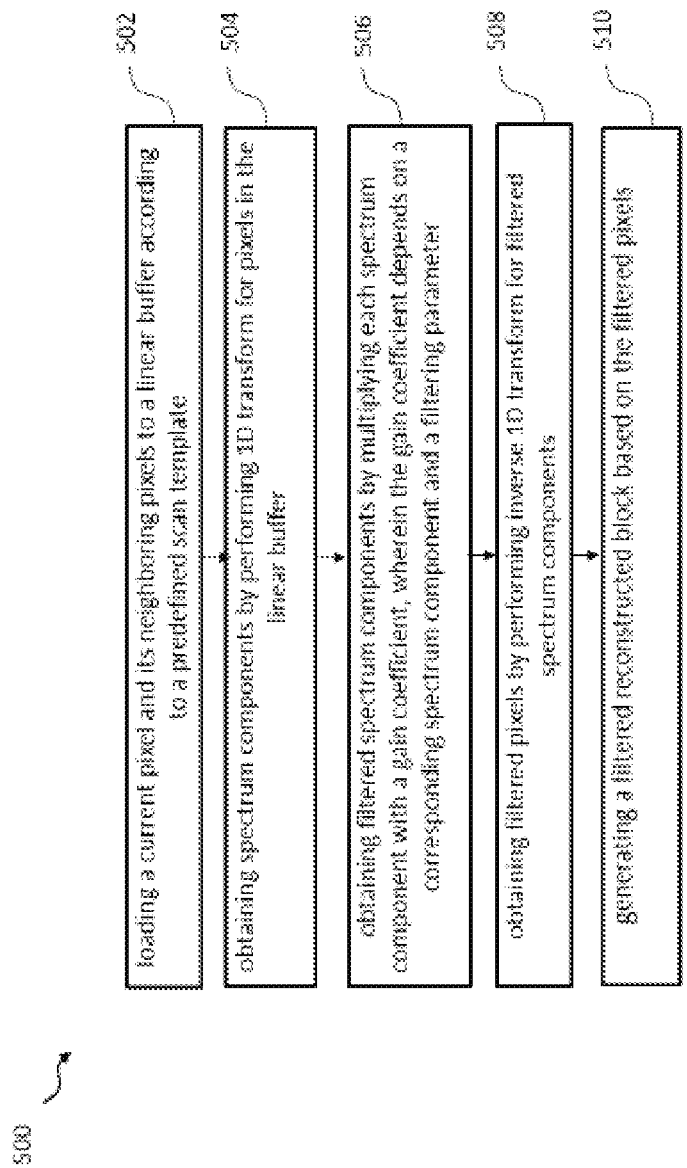
FIG. 5 shows a flow diagram illustrating steps of a filtering method according to an embodiment.

FIG. 5 shows a flow diagram illustrating steps of a corresponding in-loop filtering method 500 according to an embodiment. The reconstructed block comprises a plurality of pixels. The method 500 comprises the following steps loading 502 a current pixel and its neighboring pixels to a linear buffer according to a predefined scan template, obtaining 504 spectrum components by performing 1D transform for pixels in the linear buffer, obtaining 506 filtered spectrum components by multiplying each spectrum component with a gain coefficient, wherein the gain coefficient depends on a corresponding spectrum component and a filtering parameter, obtaining 508 filtered pixels by performing inverse 1D transform for filtered spectrum components, and generating 510 a filtered reconstructed block based on the filtered pixels estimated on previous processing steps. Method 500 can be performed by the encoding apparatus as shown in FIG. 1 and the decoding apparatus as shown in FIG. 2. Detailed information 300, 300' of FIG. 3A or 3B is also applied to method 500 as shown in FIG. 5.

Figure 13:
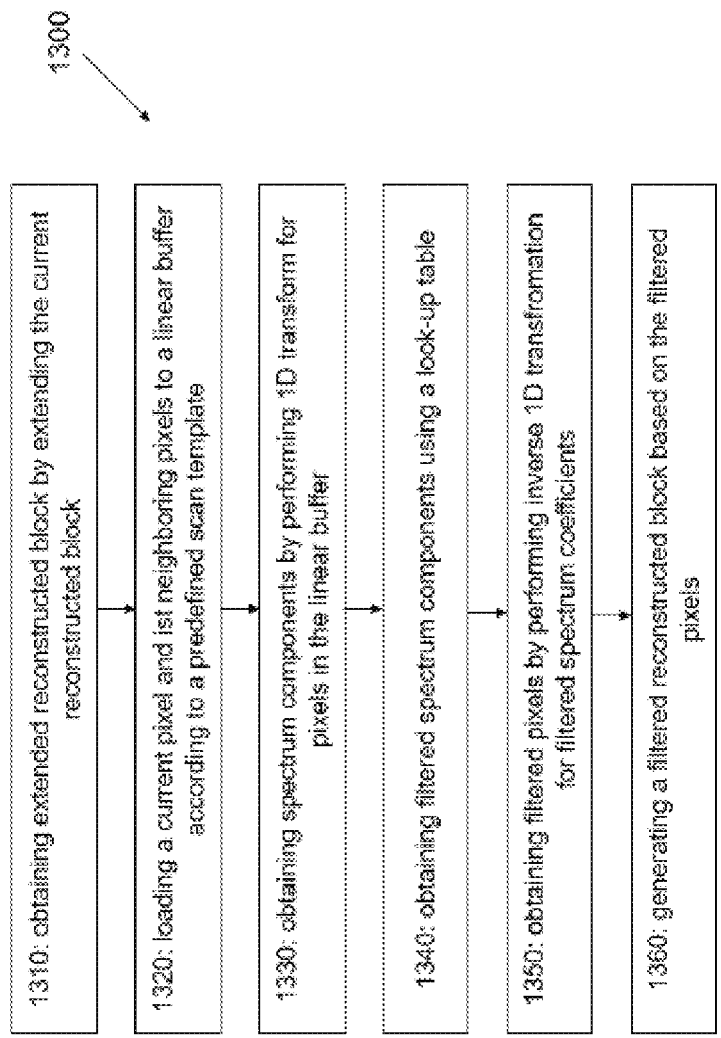
FIG. 13 is a flow diagram illustrating a method according to an embodiment.

FIG. 13 shows a flow diagram illustrating steps of a corresponding (in-loop or post) filtering method 1300 according to an embodiment. The reconstructed block comprises a plurality of pixels (samples). The method 1300 comprises the following steps of obtaining 1310 an extended reconstructed block by extending the current reconstructed block to include one or more padding samples obtained based on at least one sample from the current reconstructed block, loading 1320 a current pixel of the extended reconstructed block and its neighboring pixels of the current pixel to a linear buffer according to a predefined scan template, obtaining 1330 spectrum components by performing 1D transform for pixels in the linear buffer, obtaining 1340 filtered spectrum components by using a lookup table, obtaining 1350 filtered pixels by performing inverse 1D transform for filtered spectrum components, and generating 1360 a filtered reconstructed block based on the filtered pixels. The method 1300 can be performed by the encoding apparatus as shown in FIG. 1 or 10 and the decoding apparatus as shown in FIG. 2 or 11. Detailed information 300, 300' of FIG. 3A or 3B may be also applied to method 1300 as shown in FIG. 13.

Figure 6:
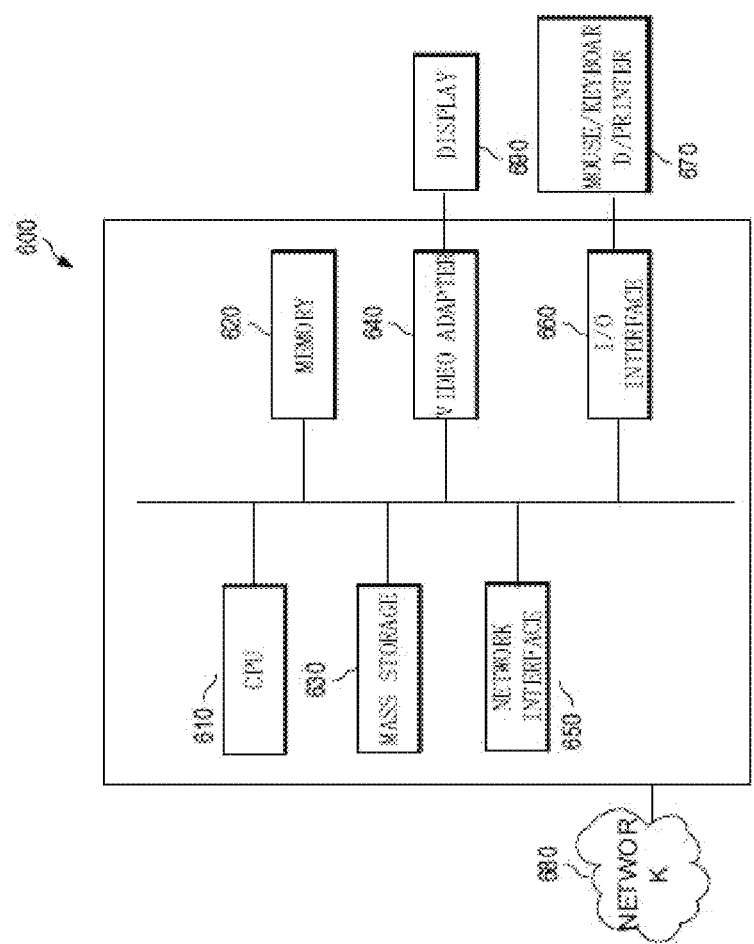
FIG. 6 is a schematic diagram illustrating an exemplary structure of an apparatus according to an embodiment.

FIG. 6 is a block diagram of an apparatus 600 that can be used to implement various embodiments. The apparatus 600 may be the encoding apparatus as shown in FIG. 1 or 10 and the decoding apparatus as shown in FIG. 2 or 11. Additionally, the apparatus 600 can host one or more of the described elements. In some embodiments, the apparatus 600 is equipped with one or more input/output devices, such as a speaker, microphone, mouse, touchscreen, keypad, keyboard, printer, display, and the like. The apparatus 600 may include one or more central processing units (CPUs) 610, a memory 620, a mass storage 630, a video adapter 640, and an I/O interface 660 connected to a bus. The bus is one or more of any type of several bus architectures including a memory bus or memory controller, a peripheral bus, a video bus, or the like.

The CPU 610 may have any type of electronic data processor. The memory 620 may have, or be, any type of system memory such as static random-access memory (SRAM), dynamic random-access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage 630 includes any type of storage device that stores data, programs, and other information and to make the data, programs, and other information accessible via the bus. The mass storage 630 includes, for example, one or more of a solid-state drive, hard disk drive, a magnetic disk drive, an optical disk drive, or the like.

The video adapter 640 and the I/O interface 660 provide interfaces to couple external input and output devices to the apparatus 600. For example, the apparatus 600 may provide Structured Query Language (SQL) command interface to clients. As illustrated, examples of input and output devices include a display 690 coupled to the video adapter 640 and any combination of mouse/keyboard/printer 670 coupled to the input/output (I/O) interface 660. Other devices may be coupled to the apparatus 600, and additional or fewer interface cards may be utilized. For example, a serial interface card (not shown) may be used to provide a serial interface for a printer.

The apparatus 600 also includes one or more network interfaces 650, which includes wired links, such as an Ethernet cable or the like, and/or wireless links to access nodes or one or more networks 680. The network interface 650 allows the apparatus 600 to communicate with remote units via the networks 680. For example, the network interface 650 may provide communication to database. In an embodiment, the apparatus 600 is coupled to a local-area network or a wide-area network for data processing and communications with remote devices, such as other processing units, the Internet, remote storage facilities, or the like.

Proposed design of in-loop filter has the following advantages in respect to conventional ALF method.

The proposed frequency domain filter derives filtering parameters (frequency domain gain coefficients) from reconstructed frame on the decoder side and so filtering parameters is not required to be transferred from encoder to decoder side.

ALF requires complex RDO on the encoder side for decreasing number of weighted coefficients for transmission. Proposed method does not require complex RDO on the encoder side (no parameters transferring) and applied for all blocks which satisfy the predefined conditions.

ALF is linear filter in pixel domain. The proposed filter is non-linear because gain coefficient for each 1D spectrum component depends on this spectrum component value. It allows to achieve additional coding gain from non-linear processing.

ALF requires universal multipliers on the decoder side. In proposed method filtering can be implemented as lookup table, because gain for each spectrum coefficient is less one. Therefore, the proposed method can be implemented without any multiplication.

Thus, the filter is provided allowing improving the efficiency for video coding with low complexity.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as further described herein.

In the following, some exemplary embodiments and implementations are summarized. In a first exemplary embodiment, a filter is provided for use in a video encoding apparatus or a decoding apparatus, wherein the filter is configured for processing a current reconstructed block, the current reconstructed block comprises a plurality of pixels, and wherein the filter is configured to load a current pixel of the current reconstructed block and its neighboring pixels of the current pixel to a linear buffer according to a predefined scan template, obtain spectrum components by performing 1D transform for pixels in the linear buffer, obtain filtered spectrum components by multiplying each spectrum component with a gain coefficient or by using a lookup table, wherein the gain coefficient depends on a corresponding spectrum component and a filtering parameter, obtain filtered pixels by performing inverse 1D transform for filtered spectrum components, and generate a filtered reconstructed block based on the filtered pixels.

In a second example, the current reconstructed block is padded by one or more samples containing at least one sample obtained based on at least one sample from previously reconstructed adjacent blocks.

In a third example, padding samples are samples from previously reconstructed adjacent blocks.

In a fourth example, padding samples are filtered samples from previously reconstructed adjacent blocks.

In a fifth example, padding samples are samples intended for intra prediction of a current image block.

In a sixth example, the filter is further configured to obtain padding samples (such as reference samples as illustrated in FIG. 9), wherein the padding samples is based on the result of intra reference samples derivation.

In a seventh example, the intra reference samples derivation comprises checking of availability of neighboring reconstructed samples and retrieving the neighboring reconstructed samples if the neighboring reconstructed samples are available, and substitution the neighboring reconstructed samples by other available neighboring samples if the neighboring reconstructed samples are not available.

In an eighth example, the current reconstructed block is intra predicted block.

In a ninth example, the current reconstructed block is inter predicted block.

In a tenth example, the reconstructed block is padded by samples containing at least one sample from the current reconstructed blocks.

In an eleventh example, the current reconstructed block is intra predicted block.

In a twelfth example, the current reconstructed block is inter predicted block.

In a 13th example, the reconstructed block is padded by samples obtained based on samples (such as neighboring samples or reference samples) from previously reconstructed adjacent blocks and padded by samples from the current reconstructed block.

In a 14th example, the reconstructed block is padded on left and top sides by samples obtained based on samples from previously reconstructed adjacent blocks.

In a 15th example, the reconstructed block is padded on right and bottom sides by samples from the current reconstructed block.

In a 16th example, the reconstructed block is padded by at least one sample obtained based on sample from at least one previously reconstructed adjacent block when the previously reconstructed adjacent block is available and/or the current reconstructed block is padded by sample from the current reconstructed block when the previously reconstructed adjacent block is not available.

In a 17th example, for neighboring samples (such as samples at position x<0 or x>=nCbW or y<0 or y>=nCbH) belonging to at least neighboring block, it is determined whether the neighboring block is available for the current block based on one or more of the following blocks coding order, the current block and the neighboring block belong to the same picture group, wherein the same picture group includes the same slice, the same tile or the same tile group, or a location of the neighboring block beyond a picture boundary.

In a 18th example, the current reconstructed block is inter predicted block and the reconstructed block is padded by samples obtained based on samples from previously reconstructed adjacent block only if the previously reconstructed adjacent block is inter predicted block.

In a 19th example, differences between all filtered and corresponding unfiltered pixels are added to an accumulation buffer according to the predefined scan template, and wherein the accumulation buffer is initialized by unfiltered pixels multiplied by maximum number of pixel values to be added in the block.

In a 20th example, final filtered pixels are obtained as accumulated values in the accumulation buffer divided by maximum number of pixel values to be added in the block.

In a 21th example, the filter is applied depending on conditions, wherein the conditions comprise at least one of: (i) the reconstructed block with non-zero residual signal; (ii) a size of the reconstructed block; (iii) an aspect ratio of the reconstructed block; or (iv) a prediction mode of the reconstructed block.

In a 22th example, a filter parameter sigma and the predefined scan template are depending on the conditions.

In a 23th example, the 1D transform is a Hadamard transform.

In another example, the lookup table is obtained based on current block QP.

In a further example, the gain coefficient depends on a corresponding spectrum component and a filtering parameter obtained based on current block QP, or the gain coefficient depends on a corresponding spectrum component and current block QP.

In a 24th exemplary embodiment a method is provided for processing a current reconstructed block, wherein the current reconstructed block comprises a plurality of pixels, wherein the filtering method comprises loading a current pixel of the current reconstructed block and its neighboring pixels of the current pixel to a linear buffer according to a predefined scan template, obtaining spectrum components by performing 1D transform for pixels in the linear buffer, obtaining filtered spectrum components by multiplying each spectrum component with a gain coefficient or by using a lookup table, wherein the gain coefficient depends on a corresponding spectrum component and a filtering parameter, obtaining filtered pixels by performing inverse 1D transform for filtered spectrum components, and generating a filtered reconstructed block based on the filtered pixels.

In a 25th example, the current reconstructed block is padded by one or more samples containing at least one sample obtained based on at least one sample from previously reconstructed adjacent blocks.

In a 26th example, wherein padding samples are samples from previously reconstructed adjacent blocks.

In a 27th example, padding samples are filtered samples from previously reconstructed adjacent blocks.

In a 28th example, padding samples are samples intended for intra prediction of a current image block.

In a 29th example, wherein the filter is further configured to obtain padding samples (such as reference samples as illustrated in FIG. 9), wherein the padding samples is based on the result of intra reference samples derivation.

In a 30th example, the intra reference samples derivation comprises checking of availability of neighboring reconstructed samples and retrieving the neighboring reconstructed samples if the neighboring reconstructed samples are available, substitution the neighboring reconstructed samples by other available neighboring samples if the neighboring reconstructed samples are not available.

In a 31st example, the current reconstructed block is intra predicted block.

In a 32nd example, wherein the current reconstructed block is inter predicted block.

In a 33th example, the reconstructed block is padded by samples containing at least one sample from the current reconstructed blocks.

In a 34th example, wherein the current reconstructed block is intra predicted block.

In a 35th example, the current reconstructed block is inter predicted block.

In a 36th example, the reconstructed block is padded by samples obtained based on samples (such as neighboring samples or reference samples) from previously reconstructed adjacent blocks and padded by samples from the current reconstructed block.

In a 37th example, the current reconstructed block is padded on left and top sides by samples obtained based on samples from previously reconstructed adjacent blocks.

In a 38th example, wherein the current reconstructed block is padded on right and bottom sides by samples from the current reconstructed block.

In a 39th example, the current reconstructed block is padded by at least one sample obtained based on sample from at least one previously reconstructed adjacent block when the previously reconstructed adjacent block is available, and/or the current reconstructed block is padded by sample from the current reconstructed block when the previously reconstructed adjacent block is not available.

In a 40th example, for neighboring samples (such as samples at position x<0 or x>=nCbW or y<0 or y>=nCbH) belonging to at least neighboring block, it is determined whether the neighboring block is available for the current block based on one or more of the following blocks coding order, the current block and the neighboring block belong to the same picture group, wherein the same picture group includes the same slice, the same tile or the same tile group, a location of the neighboring block beyond a picture boundary.

In a 41st example, the current reconstructed block is inter predicted block and the current reconstructed block is padded by samples obtained based on samples from previously reconstructed adjacent block only if the previously reconstructed adjacent block is inter predicted block.

In a 42nd example, differences between all filtered and corresponding unfiltered pixels are added to an accumulation buffer according to the predefined scan template, and wherein the accumulation buffer is initialized by unfiltered pixels multiplied by maximum number of pixels to be added in the block before the obtaining filtered spectrum components.

In a 43rd example, final filtered pixels are obtained as accumulated values in the accumulation buffer divided by maximum number of pixels to be added in the block, and wherein one or more processor configured to generate the filtered reconstructed block based on the final filtered pixels.

In a 44th example, the 1D transform is a Hadamard transform.

In another example, the lookup table is obtained based on current block QP.

In another example, the gain coefficient depends on a corresponding spectrum component and a filtering parameter obtained based on current block QP, or the gain coefficient depends on a corresponding spectrum component and current block QP.

In a 45th exemplary embodiment, a filter is provided for use in an encoding apparatus or a decoding apparatus, wherein the filter is configured for processing a current reconstructed block, the current reconstructed block comprises a plurality of samples, and wherein the filter comprises one or more processor or one or more processing circuitry configured to load a current sample and its neighboring samples to a linear buffer according to a predefined scan template, wherein the neighboring samples comprise M samples which are neighboring to the current sample and from the current reconstructed block, and N samples which are neighboring to the current sample and from previously reconstructed adjacent blocks, and N>=0, obtain spectrum components by performing 1D transform for samples in the linear buffer, obtain filtered spectrum components by multiplying each spectrum component with a gain coefficient or by using a lookup table, wherein the gain coefficient depends on a corresponding spectrum component and a filtering parameter, obtain filtered samples by performing inverse 1D transform for filtered spectrum components, and generate a filtered reconstructed block based on the filtered samples.

In a 46th example, M+N=3, or M+N=8.

In a 47th example, the N samples comprises samples neighboring to the top side of the current reconstructed block, and/or samples neighboring to the left side of the current reconstructed block.

In a 48th example, the N samples comprises N1 samples neighboring to the bottom side of the current reconstructed block, and/or N2 samples neighboring to the right side of the current reconstructed block, wherein the N1 samples are padded by available samples that are at corresponding bottom position and from the current reconstructed block, and wherein the N2 samples are padded by available samples that are at corresponding right position and from the current reconstructed block.

In a 49th example, the current reconstructed block is padded by one or more samples containing at least one sample obtained based on at least one sample from previously reconstructed adjacent blocks.

In a 50th example, padding samples are samples from previously reconstructed adjacent blocks.

In a 51st example, padding samples are filtered samples from previously reconstructed adjacent blocks.

In a 52nd example, padding samples are samples intended for intra prediction of a current image block.

In a 53rd example, the filter is further configured to obtain padding samples (such as reference samples as illustrated in FIG. 9), wherein the padding samples is based on the result of intra reference samples derivation.

In a 54th example, the intra reference samples derivation comprises checking of availability of neighboring reconstructed samples and retrieving the neighboring reconstructed samples if the neighboring reconstructed samples are available, substitution the neighboring reconstructed samples by other available neighboring samples if the neighboring reconstructed samples are not available.

In a 55th example, the current reconstructed block is intra predicted block or the current reconstructed block is inter predicted block.

In a 57th example, the current reconstructed block is padded by samples containing at least one sample from the current reconstructed blocks.

In a 58th example, the current reconstructed block is intra predicted block or the current reconstructed block is inter predicted block.

In a 60th example, the current reconstructed block is padded by samples obtained based on samples (such as neighboring samples or reference samples) from previously reconstructed adjacent blocks and padded by samples from the current reconstructed block.

In a 61st example, the current reconstructed block is padded on left and top sides by samples obtained based on samples from previously reconstructed adjacent blocks.

In a 62nd example, the current reconstructed block is padded on right and bottom sides by samples from the current reconstructed block.

In a 63rd example, the current reconstructed block is padded by at least one sample obtained based on sample from at least one previously reconstructed adjacent block when the previously reconstructed adjacent block is available and/or the current reconstructed block is padded by sample from the current reconstructed block when the previously reconstructed adjacent block is not available.

In a 64th example, for neighboring samples (such as samples at position x<0 or x>=nCbW or y<0 or y>=nCbH) belonging to at least neighboring block, it is determined whether the neighboring block is available for the current block based on one or more of the following blocks coding order, the current block and the neighboring block belong to the same picture group, wherein the same picture group includes the same slice, the same tile or the same tile group, a location of the neighboring block beyond a picture boundary.

In a 65th example, the current reconstructed block is inter predicted block and the current reconstructed block is padded by samples obtained based on samples from previously reconstructed adjacent block only if the previously reconstructed adjacent block is inter predicted block.

In another example, the lookup table is obtained based on current block QP.

In another example, the gain coefficient depends on a corresponding spectrum component and a filtering parameter obtained based on current block QP, or the gain coefficient depends on a corresponding spectrum component and current block QP.

In a 66th exemplary embodiment, an encoding apparatus is provided for encoding a current block from an input video stream, wherein the encoding apparatus comprises a filter according to any of the above embodiments and examples.

In a 67th exemplary embodiment, a decoding apparatus is provided for decoding a current reconstructed block from a received bitstream, wherein the decoding apparatus comprises a filter according to any of the above embodiments and examples.

According to an 68th exemplary embodiments, a computer program product is provided comprising program code for performing the method of any of the above mentioned embodiments and examples when executed on a computer or a processor.

The present disclosure relates a filter, to an encoder and a decoder using the filter, to a filtering method and a corresponding program, as well as to encoding and decoding using the filtering method or the filter. The filtering includes obtaining of an extended reconstructed block by extending the current reconstructed block to include at least padding samples from the current reconstructed block. After the padding, a current pixel of the extended reconstructed block and its neighboring pixels are loaded into a linear buffer and transformed with a 1D transform. The filtering is performed in frequency domain using a look-up table and the filtered pixels are transformed back.

Following is an explanation of the applications of the encoding method as well as the decoding method as shown in the above-mentioned embodiments, and a system using them.

Figure 14:
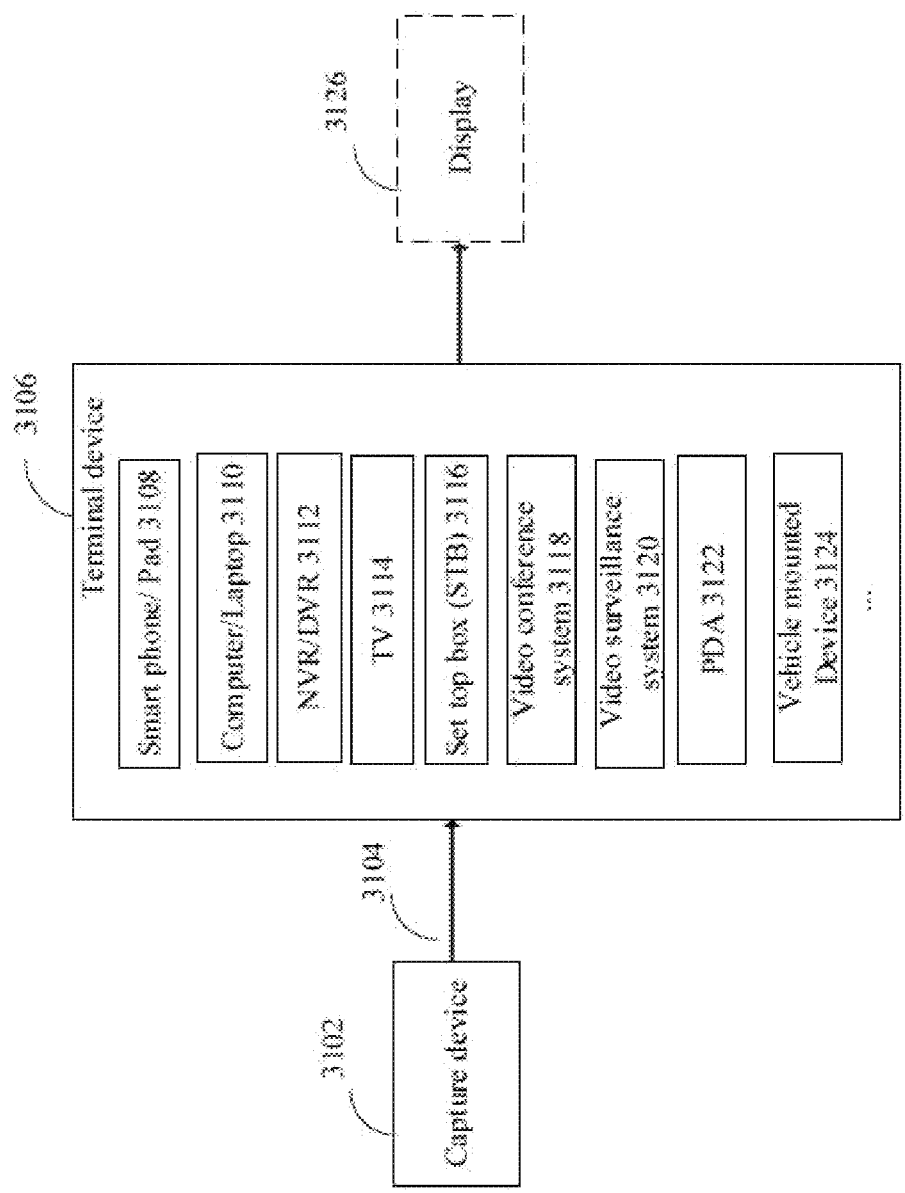
FIG. 14 is a block diagram showing an example structure of a content supply system 3100 which realizes a content delivery service.

FIG. 14 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WI-FI, Ethernet, Cable, wireless (third generation (3G)/fourth generation (4G)/fifth generation (5G)), Universal Serial Bus (USB), or any kind of combination thereof, or the like.

The capture device 3102 generates data, and may encode the data by the encoding method as shown in the above embodiments. Alternatively, the capture device 3102 may distribute the data to a streaming server (not shown in the figures), and the server encodes the data and transmits the encoded data to the terminal device 3106. The capture device 3102 includes but not limited to camera, smart phone or Pad, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, television (TV) 3114, set top box (STB) 3116, video conference system 3118, video surveillance system 3120, PDA 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, NVR/DVR 3112, TV 3114, PDA 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 15:
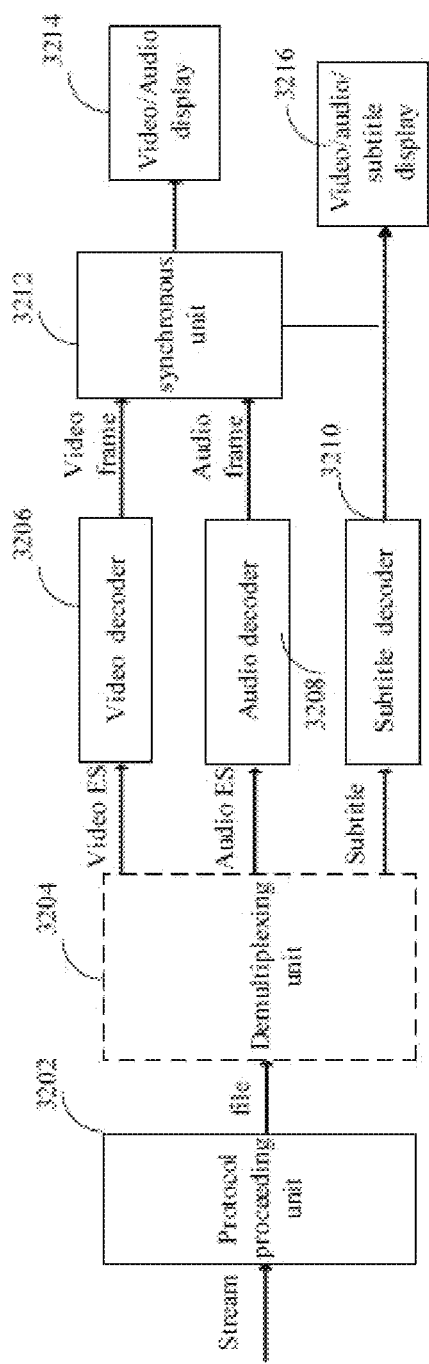
FIG. 15 is a block diagram showing a structure of an example of a terminal device.

FIG. 15 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hypertext Transfer Protocol (HTTP), HTTP Live streaming protocol (HLS), MPEG-Dynamic Adaptive Streaming over HTTP (DASH), Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optional subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 15) before feeding it to the synchronous unit 3212. Similarly, the audio frame may store in a buffer (not shown in FIG. 15) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise random-access memory (RAM), ROM, electrically erasable programmable ROM (EEPROM), compact-disc (CD) ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes CD, laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A filter for use in a video encoding apparatus or a video decoding apparatus to process a current reconstructed block comprising a plurality of pixels, wherein the filter comprises:
a memory configured to store instructions; and
a processor coupled to the memory, wherein the instructions cause the processor to be configured to:
obtain an extended reconstructed block by extending the current reconstructed block to comprise one or more padding samples obtained based on at least one sample from the current reconstructed block;
load a current pixel of the extended reconstructed block and neighboring pixels of the current pixel to a linear buffer according to a predefined scan template;
obtain spectrum components by performing a one-dimensional (1D) transform for pixels in the linear buffer;
obtain filtered spectrum components based on the spectrum components using a lookup table;
obtain filtered pixels by performing an inverse 1D transform for the filtered spectrum components; and
generate a filtered reconstructed block based on the filtered pixels.

2. The filter of claim 1, wherein the current reconstructed block is extended to further include one or more padding samples obtained based on at least one sample from a neighboring reconstructed block adjacent to the current reconstructed block.

3. The filter of claim 2, wherein the instructions further cause the processor to be configured to further extend the current reconstructed block to comprise the one or more padding samples obtained based on the at least one sample from the neighboring reconstructed block when the neighboring reconstructed block is available and/or the current reconstructed block is extended to include a sample from the current reconstructed block when the neighboring reconstructed block is not available.

4. The filter of claim 3, wherein the instructions further cause the processor to be configured to derive an availability of the neighboring reconstructed block as follows:
the availability is false when one or more of the following conditions are true:
the neighboring reconstructed block is contained in a different tile than the current reconstructed block;
a location of the neighboring reconstructed block is beyond a picture boundary; or
a variable indicating whether the neighboring reconstructed block has been reconstructed is equal to false; and
the availability is true when all of the conditions are false.

5. The filter of claim 2, wherein the one or more padding samples are filtered samples from the neighboring reconstructed block, and wherein the neighboring reconstructed block is a previously reconstructed block adjacent to the current reconstructed block.

6. The filter of claim 1, wherein the current reconstructed block is extended on a left side and a top side to comprise one or more padding samples obtained based on samples from neighboring reconstructed blocks on the left side and the top side.

7. The filter of claim 1, wherein the instructions further cause the processor to be configured to further obtain the extended reconstructed block by extending the current reconstructed block to comprise the following on respective sides of the current reconstructed block:
for each side of the respective sides that has a corresponding adjacent neighboring reconstructed block that is available, neighboring reconstructed samples from the corresponding adjacent neighboring reconstructed block that is available; and
for each side of the respective sides that does not have the corresponding adjacent neighboring reconstructed block that is available, closest samples from the current reconstructed block.

8. The filter of claim 1, wherein the instructions further cause the processor to be configured to obtain the lookup table based on a quantization parameter (QP) of the current reconstructed block.

9. A method for processing a current reconstructed block comprising a plurality of pixels, wherein the method comprises:
obtaining an extended reconstructed block by extending the current reconstructed block to comprise the one or more padding samples obtained based on at least one sample from the current reconstructed block;
loading a current pixel of the extended reconstructed block and neighboring pixels of the current pixel to a linear buffer according to a predefined scan template;
obtaining spectrum components by performing one-dimensional (1D) transform for pixels in the linear buffer;
obtaining filtered spectrum components by multiplying each of the spectrum components with a gain coefficient or using a lookup table, wherein the gain coefficient depends on a corresponding spectrum component and a filtering parameter;
obtaining filtered pixels by performing inverse 1D transform for the filtered spectrum components; and
generating a filtered reconstructed block based on the filtered pixels.

10. The method of claim 9, wherein the current reconstructed block is extended to further include one or more padding samples obtained based on at least one sample from a neighboring reconstructed block adjacent to the current reconstructed block.

11. The method of claim 10, further comprising further extending the current reconstructed block to comprise the one or more padding samples obtained based on the at least one sample from the neighboring reconstructed block when the neighboring reconstructed block is available, and/or the current reconstructed block is extended to include a sample from the current reconstructed block when the neighboring reconstructed block is not available.

12. The method of claim 11, further comprising deriving an availability of the neighboring reconstructed block as follows:
the availability is false when one or more of the following conditions are true:
the neighboring reconstructed block is contained in a different tile than the current reconstructed block;
a location of the neighboring reconstructed block is beyond a picture boundary; or
a variable indicating whether the neighboring reconstructed block has been reconstructed is equal to false; and
the availability is true when all of the conditions are false.

13. The method of claim 10, wherein the one or more padding samples are filtered samples from the neighboring reconstructed block, and wherein the neighboring reconstructed block is a previously reconstructed block adjacent to the current reconstructed block.

14. The method of claim 9, further comprising extending the current reconstructed block on a left side and a top side to comprise the one or more padding samples obtained based on samples from previously reconstructed adjacent blocks on the left side and the top side.

15. The method of claim 11, further comprising extending the current reconstructed block to comprise the following on respective sides of the current reconstructed block:
for each side of the respective sides that has a corresponding adjacent neighboring reconstructed block that is available, neighboring reconstructed samples from the corresponding adjacent neighboring reconstructed block that is available; and
for each side of the respective sides that does not have the corresponding adjacent neighboring reconstructed block that is available, closest samples from the current reconstructed block.

16. The method of claim 9, further comprising obtaining the lookup table based on a quantization parameter (QP) of the current reconstructed block.

17. The method of claim 9, further comprising encoding a current block from an input video stream by filtering the current reconstructed block of the current block.

18. The method of claim 9, further comprising decoding the current reconstructed block from a received bitstream.

19. The filter of claim 1, wherein the instructions further cause the processor to be configured to encode a current block from an input video stream by filtering the current reconstructed block of the current block.

20. The filter of claim 1, wherein the instructions further cause the processor to be configured to decode the current reconstructed block from a received bitstream.

21. A computer program product comprising computer-executable instructions that are stored on a non-transitory computer-readable medium and that, when executed by a processor, cause an apparatus to:
obtain an extended reconstructed block by extending a current reconstructed block to comprise one or more padding samples obtained based on at least one sample from the current reconstructed block;
load a current pixel of the extended reconstructed block and neighboring pixels of the current pixel to a linear buffer according to a predefined scan template;
obtain spectrum components by performing one-dimensional (1D) transform for pixels in the linear buffer;
obtain filtered spectrum components by multiplying each of the spectrum components with a gain coefficient or using a lookup table, wherein the gain coefficient depends on a corresponding spectrum component and a filtering parameter;
obtain filtered pixels by performing inverse 1D transform for the filtered spectrum components; and
generate a filtered reconstructed block based on the filtered pixels.

22. The method of claim 9, further comprising decoding, using a decoder, the current reconstructed block from a received bitstream.

23. The method of claim 9, further comprising encoding, using an encoder, a current block from an input video stream by filtering the current reconstructed block of the current block.

24. A non-transitory computer-readable medium comprising computer-executable instructions that, when executed by a processor, cause an apparatus to:
obtain an extended reconstructed block by extending a current reconstructed block to comprise one or more padding samples obtained based on at least one sample from the current reconstructed block;
load a current pixel of the extended reconstructed block and neighboring pixels of the current pixel to a linear buffer according to a predefined scan template;
obtain spectrum components by performing one-dimensional (1D) transform for pixels in the linear buffer;
obtain filtered spectrum components by multiplying each of the spectrum components with a gain coefficient or using a lookup table, wherein the gain coefficient depends on a corresponding spectrum component and a filtering parameter;
obtain filtered pixels by performing inverse 1D transform for the filtered spectrum components; and
generate a filtered reconstructed block based on the filtered pixels.

* * * * *